United States Patent [19]

Minami et al.

[11] Patent Number: 5,658,998

[45] Date of Patent: *Aug. 19, 1997

[54] RANDOM COPOLYMER, AND PROCESS AND PRODUCTION THEREOF

[75] Inventors: Syuji Minami; Hirokazu Kajiura, both of Ohtake; Hidekuni Oda, Iwakuni, all of Japan

[73] Assignee: Mitsui Petrochemical Industries, Ltd., Tokyo, Japan

[*] Notice: The term of this patent shall not extend beyond the expiration date of Pat. No. 5,179,171.

[21] Appl. No.: 407,045

[22] Filed: Mar. 17, 1995

Related U.S. Application Data

[60] Continuation of Ser. No. 772,441, Oct. 7, 1991, abandoned, which is a division of Ser. No. 715,867, Jun. 17, 1991, abandoned, which is a continuation of Ser. No. 596,423, Oct. 11, 1990, abandoned, which is a continuation of Ser. No. 470,435, Jan. 24, 1990, abandoned, which is a continuation of Ser. No. 323,050, Mar. 14, 1989, abandoned, which is a continuation of Ser. No. 81,601, Aug. 3, 1987, abandoned, which is a continuation of Ser. No. 867,138, May 27, 1986, abandoned.

[30] Foreign Application Priority Data

| May 24, 1985 | [JP] | Japan | 60-110545 |
| May 28, 1985 | [JP] | Japan | 60-113074 |
| Jul. 30, 1985 | [JP] | Japan | 60-166895 |

[51] Int. Cl.$^6$ .................. C08F 232/04; C08F 210/02
[52] U.S. Cl. .................................. 526/281; 526/348
[58] Field of Search ........................ 526/281, 348

[56] References Cited

U.S. PATENT DOCUMENTS

| 3,277,036 | 10/1966 | Whitworth, Jr. . |
| 3,478,002 | 11/1969 | Nakaguchi et al. ........... 260/79.5 |
| 3,494,897 | 2/1970 | Reding et al. ............... 526/281 |
| 4,020,021 | 4/1977 | Lehouste et al. . |
| 4,136,249 | 1/1979 | Tenney et al. . |
| 4,138,448 | 2/1979 | Minchak . |
| 4,195,013 | 3/1980 | de Zarauz . |
| 4,588,794 | 5/1986 | Oda et al. . |
| 4,599,391 | 7/1986 | Yamamoto et al. . |
| 4,614,778 | 9/1986 | Kajiura et al. .............. 526/281 |
| 5,179,171 | 1/1993 | Minami et al. .............. 525/288 |

FOREIGN PATENT DOCUMENTS

| 920742 | 2/1973 | Canada . |
| 0156464 | 10/1985 | European Pat. Off. . |
| 2421838 | 1/1975 | Germany . |
| 60-168708 | 9/1985 | Japan . |
| 1520053 | 8/1978 | United Kingdom . |

OTHER PUBLICATIONS

T.P. Wilson, W.C. Von Dohlenb, and J.V. Koleske, Journal of Polymer Science, Polymer Physics Edition, 12, 1607–1618, 1974.

"Journal of Polymer Science", Polymer Physics Edition, vol. 12, 1607–1618 (1974).

*Primary Examiner*—Joseph L. Schofer
*Assistant Examiner*—Wu C. Cheng
*Attorney, Agent, or Firm*—Sherman and Shalloway

[57] ABSTRACT

A random copolymer characterized in that (A) the copolymer comprises polymerized units from ethylene and polymerized units from at least one cycloolefin, (B) the mole ratio of the polymerized units from the cycloolefin to the polymerized units from ethylene is from 3:97 to 60:40, (C) the cycloolefin is incorporated in the polymer chain without ring opening, (D) the copolymer has an intrinsic viscosity of 0.01 to 20 dl/g, (E) the copolymer has a molecular weight distribution (Mw/Mn) of not more than 4, and (F) the copolymer has a crystallinity of 0 to 10%. The random copolymer may be grafted by (a) alpha, beta-unsaturated carboxylic acids and/or their derivatives, (b) styrenes, (c) organic silicon compounds having an olefinically unsaturated bond and a hydrolyzable group, or (d) unsaturated epoxy monomers. The random copolymer is produced by continuously copolymerizing ethylene with at least one cycloolefin in a hydrocarbon medium in the presence of a catalyst formed from a soluble vanadium compound and an organoaluminum compound while maintaining the atomic ratio of vanadium atoms to aluminum atoms in the reaction system, V/Al, at 2 or higher.

21 Claims, No Drawings

RANDOM COPOLYMER, AND PROCESS AND PRODUCTION THEREOF

This application is a continuation of application Ser. No. 07/772,441, filed Oct. 7, 1991 which is a division application of Ser. No. 07/715,867, filed Jun. 17, 1991, which is a continuation of 07/596,423, filed on Oct. 11, 1990, which is a continuation of 07/470,435 filed on Jan. 24, 1990, which is a continuation of 07/323,050 filed on Mar. 14, 1989, which is a continuation of 07/081,601 filed on Aug. 3, 1987, which is a continuation of 06/867,138 filed on May 27, 1986, all of them have been abandoned.

This invention relates to a novel random copolymer comprising at least polymerized units from ethylene and polymerized units from a cycloolefin as monomers, and a process for production thereof. More specifically, it relates to a cycloolefin type random copolymer having excellent transparency, thermal resistance, heat aging resistance, chemical resistance, solvent resistance, dielectric properties and mechanical properties and a narrow molecular weight distribution.

Polycarbonate, poly(methyl methacrylate) and poly(ethylene terephthalate) are known as synthetic resins having excellent transparency. The polycarbonate resin has excellent heat resistance, heat aging resistance and impact strength as well as excellent transparency, but has the defect of poor chemical resistance whereby it is readily attacked by strong alkalies. Poly(methyl methacrylate) has the defect that it is susceptible to attack by ethyl acetate, acetone and toluene, is swollen in ether, and has low heat resistance. Polyethylene terephthalate has excellent heat resistance and mechanical properties but has the defect of possessing weak resistance to strong acids or alkalies and being susceptible to hydrolysis.

Many of polyolefins well known as general-purpose resins have excellent chemical resistance, solvent resistance and mechanical properties, but have poor heat resistance. Furthermore, they have poor transparency because they are crystalline. The transparency of polyolefins is generally improved by adding a nucleating agent to render the crystal structure fine, or by performing quenching to stop the growth of crystals, but such measures have not proved to be entirely effective. Rather, the addition of a third component such as the nucleating agent is likely to impair the inherent excellent properties of the polyolefins. Furthermore, the quenching method requires large scale equipment, and is also likely to reduce heat resistance or rigidity with a decrease in crystallinity.

On the other hand, methods have been proposed for producing polymers having superior transparency by copolymerizing ethylene with bulky comonomers. U.S. Pat. No. 2,883,372 discloses a copolymer of ethylene with 2,3-dihydrodicyclopentadiene. This copolymer has a well balanced combination of rigidity and transparency but low heat resistance as shown by its glass transition temperature of about 100° C.

Japanese Patent Publication No. 14,910/1971 discloses a process for producing a homo- or co-polymer having polymerized units represented by the following formula (a)

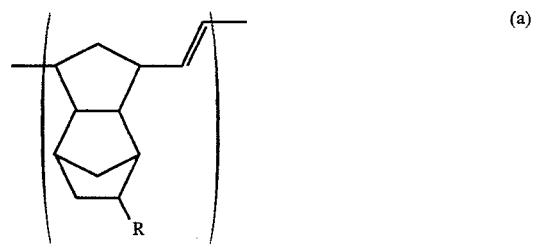

wherein R is hydrogen or a lower alkyl group, which comprises polymerizing a 1,4,5,8-dimethano-1,2,3,4,4a,5,8,8a-octahydronaphthalene represented by the following formula (b)

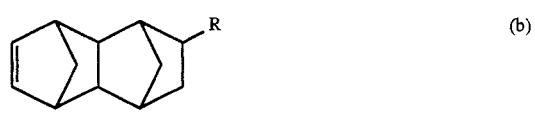

wherein R is as defined above, alone or with a cyclic olefin selected from styrene, acenaphthylene, bicyclo-[2.2.1]heptene-2, alkyl-substituted products of the heptene and cyclopentene in the presence of an alcohol as a reducing agent using a halide of a noble metal such as ruthenium as a catalyst.

Homo- or co-polymers comprising the 1,4,5,8-dimethano-1,2,3,4,4a,5,8,8a-octahydronaphthalene as part or the whole of monomers and methods for production thereof are also disclosed in Japanese Laid-Open Patent Publications Nos. 159,598/1975, 127,728/1983, 51,911/1984, 81,315/1984 and 81,316/1984 and U.S. Pat. No. 4,178,424.

The polymers disclosed in these prior art documents are ring-opened polymers having polymerized units resulting from ring-opening of monomers as in the polymerized units represented by formula (a). As can be understood from the formula (a), these ring-opened polymers are structurally characterized by the fact that the main polymer chain contains an unsaturated vinyl linkage. Because of the presence of the unsaturated vinyl linkage, these polymers have poor heat aging resistance.

All of the polymers described in the above prior art documents are ring-opened polymers obtained by the ring scission of monomer. U.S. Pat. Nos. 3,330,815 and 3,494,897 and Journal of Polymer Science: Polymer Physics Edition, volume 12, 1607–1618 (1974) describe polymers of the type obtained by the opening of the double bond of monomer without the ring scission of the bicyclohept-2-ene skeleton of the monomer.

U.S. Pat. No. 3,330,815 discloses that a polymer comprising polymerized units of the following formula (c)

or the substitution product thereof is obtained from bicyclo [2.2.1]hept-2-ene of the following formula (d)

or its substitution product.

U.S. Pat. No. 3,494,897 discloses a process for producing a copolymer of ethylene with a bicyclo[2.2.1]-hept-2-ene represented by the following formula (e)

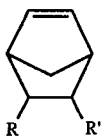
(e)

Example 44 and claim 92 of this patent discloses a copolymer of ethylene with tetracyclo[6,2,1,1$^{3,6}$,0$^{2,7}$]-4-dodecene of the following formula (f) encompassed within the formula (e)

(f)

and ethylene. The Patent does not describe the content of the tetracyclododecene of the copolymer of Example 44. When it is calculated under the assumption that all of the tetracyclododecene charged was introduced into the polymer, the polymer contains polymerized units derived from about 2 mole % at most of the tetracyclododecene. U.S. Pat. No. 3,494,897 does not at all describe specifically copolymers of ethylene with tetracyclododecenes other than the tetracyclo [6,2,1,1$^{3,6}$,0$^{2,7}$]-4-dodecene of formula (f).

Journal of Polymer Science: Polymer Physics Edition, volume 12, 1607–1618 (1974) discloses copolymers of ethylene and norbornene derivatives having dynamic mechanical properties. Table II of this document shows a copolymer of ethylene containing 1 mole % of polymerized units derived from the same compound as formula (f) (named octahydrodimethanonaphthalene in this document). Table IV thereof states that this copolymer has a beta-relaxation temperature of 15° C.

The copolymers described in these prior art references which contain only 2% at the largest of octahydrodimethanonaphthalene have a glass transition temperature of about 15° C. at the highest. They strongly exhibit a rubbery nature and have poor heat resistance and mechanical properties.

U.S. patent application Ser. No. 696,161 (European Laid-Open Patent Application No. 0156464) discloses a random copolymer composed of ethylene, a 1,4,5,8-dimethano-1,2, 3,4,4a,5,8,8a-octahydronaphthalene and optionally an alpha-olefin having at least 3 carbon atoms or a cycloolefin, wherein the mole ratio of polymerized units from the 1,4,5,8-dimethano-1,2,3,4,4a,5,8,8a-octahydronaphthalene to polymerized units from ethylene is from 3:97 to 95:5 and the 1,4,5,8-dimethano-1,2,3,4,4a,5,8,8a-octahydronaphthalene is incorporated in the polymer chain as polymerized units without ring-opening.

The specification of U.S. Pat. No. 2,883,372 discloses a normally solid copolymer of ethylene and 2,3-dihydrodicyclopentadiene having the following formula

said copolymer having a density in the range of 0.96 to 1.02 and being capable of being compression-molded at elevated temperatures into tough films.

It is an object of this invention to provide a novel random copolymer.

Another object of this invention is to provide a novel random copolymer having excellent transparency, thermal resistance, heat aging resistance, chemical resistance, solvent resistance, dielectric properties and mechanical properties.

Still another object of this invention is to provide a novel random copolymer having a narrow molecular weight distribution.

Further objects and advantages of this invention will become apparent from the following description.

According to this invention, the above objects and advantages are achieved by a novel random copolymer characterized in that (A) the copolymer comprises polymerized units from ethylene and polymerized units from at least one cycloolefin selected from the group consisting of compounds represented by the following formula (I)

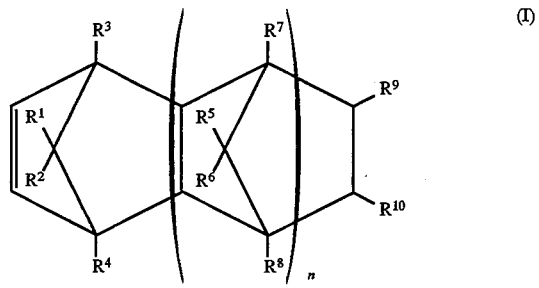
(I)

wherein $R^1$, $R^2$, $R^3$, $R^4$, $R^5$, $R^6$, $R^7$ and $R^8$ are identical or different and each represents a hydrogen atom, a halogen atom or a hydrocarbon group having 1 to 10 carbon atoms, and $R^9$ and $R^{10}$ are identical or different and each represents a hydrogen atom, a halogen atom or a hydrocarbon group having 1 to 10 carbon atoms, or $R^9$ and $R^{10}$ are bonded to each other to form a group of the following formula

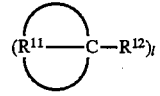

in which $R^{11}$ and $R^{12}$ are identical or different and each represents a hydrogen atom, a halogen atom or a hydrocarbon group having 1 to 10 carbon atoms, and l is an integer of 3 or 4, and n is 0 or a positive integer of 1 to 3, (B) the mole ratio of the polymerized units from the cycloolefin to the polymerized units from ethylene is from 3:97 to 60:40, (C) the cycloolefin of formula (I) is incorporated in the polymer chain as polymerized units represented by the following formula (II)

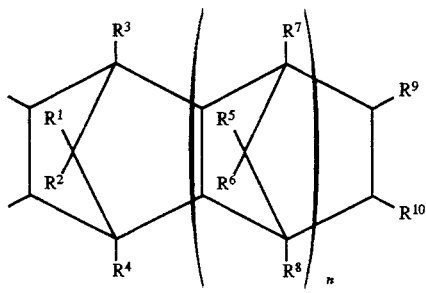

(II)

wherein all symbols are as defined above, (D) the copolymer has an intrinsic viscosity [η], measured in decalin at 135° C., of 0.01 to 20 dl/g, (E) the copolymer has a molecular weight distribution ($\overline{Mw}/\overline{Mn}$), measured by gel permeation chromatography, of not more than 4, and (F) the copolymer has a crystallinity, measured by X-ray diffractometry, of 0 to 10%.

According to this invention, the novel random copolymer of the invention can be produced by a process which comprises continuously copolymerizing ethylene with at least one cycloolefin selected from the group consisting of compounds of the following formula (I)

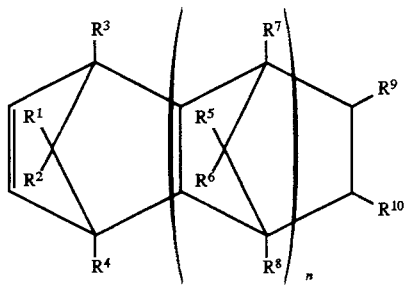

(I)

wherein all symbols Are as defined above, in a hydrocarbon medium in the presence of a catalyst formed from a soluble vanadium compound and an organoaluminum compound while maintaining the atomic ratio of aluminum atoms to vanadium atoms in the reaction system (Al/V) at 2 or higher.

The cycloolefin used in this invention is represented by the above formula (I).

In formula (I), $R^1$, $R^2$, $R^3$, $R^4$, $R^5$, $R^6$, $R^7$ and $R^8$ are identical or different, and each represents a hydrogen atom, a halogen atom or a hydrocarbon group having 1 to 10 carbon atoms. The halogen atom is, for example, fluorine, chlorine or bromine. The hydrocarbon group is preferably an alkyl group. Preferably the alkyl group has 1 to 10 carbon atoms, especially preferably 1 to 5 carbon atoms. The alkyl group may be linear or branched, and includes, for example, methyl, ethyl, n-propyl, iso-propyl, n-butyl, iso-butyl, sec-butyl, t-butyl, pentyl, hexyl, heptyl, octyl, nonyl and decyl.

In formula (I), $R^9$ and $R^{10}$ are identical or different and each represents a hydrogen atom, a halogen, atom or a hydrocarbon group having 1 to 10 carbon atoms. Alternatively, $R^9$ and $R^{10}$ are bonded to each other to form a group of the following formula

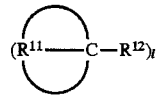

wherein $R^{11}$ and $R^{12}$ are identical or different and each represents a hydrogen atom, a halogen atom, or a hydrocarbon group having 1 to 10 carbon atoms, and l is an integer of 3 or 4.

Examples of the halogen atom and the hydrocarbon group represented by $R^9$ and $R^{10}$ are the same as those given above.

When n is 0 in formula (I), the cycloolefin of formula (I) may be represented by the following formula (I)-1

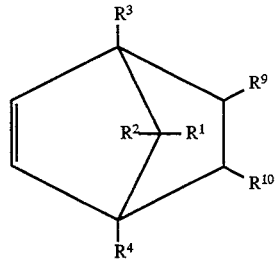

(I)-1 wherein all symbols are as defined above, and when n is a positive integer of 1 to 3, the cycloolefin of formula (I) may be represented by the following formula (I)-2

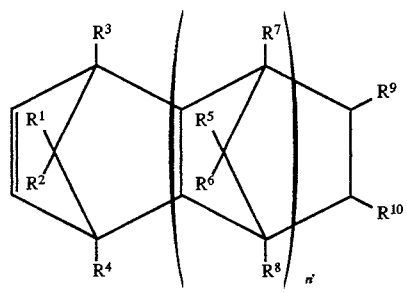

(I)-2 wherein n' is a positive integer, and all other symbols are the same as those defined for formula (I).

The integer n' is preferably 1 to 3, especially preferably 1 to 2.

Examples of the cycloolefin of formula (I) [including formulae (I)-1 and (I)-2] include bicyclo[2,2,1]hept-2-ene,
6-methylbicyclo[2,2,1]hept-2-ene,
5,6-dimethylbicyclo[2,2,1]hept-2-ene,
1-methylbicyclo[2,2,1]hept-2-ene,
6-ethylbicyclo[2,2,1]hept-2-ene,
6-n-butylbicyclo[2,2,1]hept-2-ene,
6-i-butylbicyclo[2,2,1]hept-2-ene,
7-methylbicyclo[2,2,1]hept-2-ene,
tricyclo[4,3,0,1$^{2,5}$]-3-decene,
2-methyl-tricyclo[4,3,0,1$^{2,5}$]-3-decene,
5-methyltricyclo[4,3,0,1$^{2,5}$]-3-decene,
tricyclo[4,4,0,1$^{2,5}$]-3-decene,
10-methyltricyclo[4,4,0,1$^{2,5}$]-3-decene,
1,4,5,8-dimethano-1,2,3,4,4a,5,8,8a-octahydronaphthalene,
2-methyl-1,4,5,8-dimethano-1,2,3,4,4a,5,8,8a-octahydronaphthalene,
2-ethyl-1,4,5,8-dimethano-1,2,3,4,4a,5,8,8a-octahydronaphthalene,
2-propyl-1,4,5,8-dimethano-1,2,3,4,4a,5,8,8a-octahydronaphthalene,
2-hexyl-1,4,5,8-dimethano-1,2,3,4,4a,5,8,8a-octahydronaphthalene,
2-stearyl-1,4,5,8-dimethano-1,2,3,4,4a,5,8,8a-octahydronaphthalene,
2,3-dimethyl-1,4,5,8-dimethano-1,2,3,4,4a,-5,8,8a-octahydronaphthalene, 2-methyl-3-ethyl-1,4,5,8-dimethano-1,2,3,4,4a,5,8,8a-octahydronaphthalene,
2-chloro-1,4,5,8-dimethano-1,2,3,4,4a,5,8,8a-octahydronaphthalene,
2-bromo-1,4,5,8-dimethano-1,2,3,4,4a,5,8,8a-octahydronaphthalene,
2-fluoro-1,4,5,8-dimethano-1,2,3,4,4a,5,8,8a-octahydronaphthalene,
2,3-dichloro-1,4,5,8-dimethano-1,2,3,4,4a,-5,8,8a-octahydronaphthalene,
2-cyclohexyl-1,3,5,8,-dimethano-1,2,3,4,4a,-5,8,8a-octahydronaphthalene,
2-n-butyl-1,4,5,8-dimethano-1,2,3,4,4a,5,8,8a-octahydronaphthalene,
2-isobutyl-1,4,5,8-dimethano-1,2,3,4,4a,5,8,8a-octahydronaphthalene,
5,10-dimethyltetracyclo[4,4,0,1$^{2,5}$,1$^{7,10}$]-3-dodecene,
2,10-dimethyltetracyclo[4,4,0,1$^{2,5}$,1$^{7,10}$]-3-dodecene,
11,12-dimethyltetracyclo[4,4,0,1$^{2,5}$,1$^{7,10}$]-3-dodecene,
2,7,9-trimethyltetracyclo[4,4,0,1$^{3,5}$,1$^{7,10}$]-3-dodecene,
9-ethyl-2,7-dimethyltetracyclo[4,4,0,1$^{2,5}$, 1$^{7,10}$]-3-dodecene,
9-isobutyl-2,7-dimethyltetracyclo-[4,4,0,1$^{2,5}$,1$^{9,10}$]-3-dodecene,
9,11,12-trimethyltetracyclo[4,4,0,1$^{2,5}$,1$^{7,10}$]-3dodecene,
9-ethyl-11,12-dimethyltetracyclo[4,4,0,1$^{2,5}$, 1$^{7,10}$]-3-dodecene,
9-isobutyl-11,12-dimethyl-3-tetracyclo[4,4,0,1$^{2,5}$,1$^{7,10}$]-3-dodecene,
5,8,9,10-tetramethyltetracyclo[4,4,0,1$^{2,5}$, 1$^{7,10}$]-3-dodecene,
hexacyclo[6,6,1,1$^{3,6}$,1$^{10,13}$,0$^{2,7}$,0$^{9,14}$]-4-heptadecene,
12-methylhexacyclo[6,6,1,1$^{3,6}$,1$^{10,13}$,0$^{2,7}$,0$^{9,14}$]-4-heptadecene,
12-ethylhexacyclo[6,6,1$^{3,6}$,1$^{10,13}$,0$^{3,7}$,0$^{9,14}$]-4-heptadecene,
12-isobutylhexacyclo[6,6,1,1$^{3,6}$,1$^{10,13}$,0$^{2,7}$, 0$^{9,14}$]-4-heptadecene,
1,6,10-trimethyl-12-isobutylhexacyclo[6,6,1, 1$^{3,6}$,1$^{10,13}$, 0$^{2,7}$0$^{9,14}$]-4-heptadecene,
octacyclo[8,8,1,2$^{2,9}$,1$^{4,7}$,1$^{11,19}$1$^{13,16}$,0,0$^{3,8}$, 0$^{12,17}$]-5-dococene,
15-methyloctacyclo[8,8,1$^{2,9}$,1$^{4,7}$,1$^{11,18}$,1$^{13,16}$, 0,0$^{3,8}$,0$^{12,17}$]-5-dococene,
15-ethyloctacyclo[8,8,1$^{2,9}$,1$^{4,7}$,1$^{11,18}$,1$^{13,18}$, 1$^{13,16}$,0,0$^{3,8}$, 0$^{12,17}$]-5-dodocene,
1,3-dimethylpentacyclo[6,6,1,1$^{3,6}$,0$^{2,7}$,0$^{9,14}$]-4-hexadecene,
1,6-dimethylpentacyclo[6,6,1,1$^{3,6}$,0$^{2,7}$,0$^{9,14}$]-4-hexadecene,
15,16-dimethylpentacyclo[6,6,1,1$^{3,6}$,0$^{2,7}$,0$^{9,14}$]-4-hexadecene,
pentacyclo[6,5,1,1$^{3,6}$,0$^{2,7}$,0$^{9,13}$]-4-pentadecene,
1,3-dimethylpentacyclo[6,5,1,1$^{3,6}$,0$^{2,7}$,0$^{9,13}$]-4-pentadecene,
1,6-dimethylpentacyclo[6,5,1,1$^{3,6}$,0$^{2,7}$,0$^{9,13}$]-4-pentadecene,
14,15-dimethylpentacyclo[6,5,1,1$^{3,6}$0$^{2,7}$,0$^{9,13}$]-4-pentadecene,
pentacyclo[6,6,1,1$^{3,6}$,0$^{2,7}$,0$^{9,14}$]-4-hexadecene,
heptacyclo[8,7,1$^{2,9}$,1$^{4,7}$,1$^{11,17}$,0,0$^{3,8}$,0$^{12,16}$]-5-eicosene, and
pentacyclo[8,8,1,2$^{2,9}$,1$^{4,7}$,1$^{11,18}$,0,0$^{3,8}$,0$^{12,17}$]-5-heneicosene.

The compounds of formula (I) may be used singly or in combination.

The compounds of formula (I) can be easily produced by condensing cyclopentadienes with the corresponding olefins by the Diels-Alder reaction.

According to the process of this invention, the cycloolefin of formula (I) is copolymerized continuously with ethylene in a hydrocarbon medium in the presence of a catalyst. The catalyst is one formed from a soluble vanadium compound and an organoaluminum compound. In the copolymerization reaction carried out continuously, the atomic ratio of aluminum atoms to vanadium atoms, Al/V, is maintained at at least 2.

The soluble vanadium compound used in this invention as a component of the catalyst is a vanadium compound soluble in the hydrocarbon medium in the polymerization reaction system. It may include vanadium compounds represented by the general formula $VO(OR)_aX_b$ or $V(OR)_cX_d$ wherein R is a hydrocarbon group such as an aliphatic, alicyclic or aromatic hydrocarbon group having 1 to 20 carbon atoms, preferably the aliphatic hydrocarbon group having 1 to 5 carbon atoms, especially 1 to 3 carbon atoms, $0 \leq a \leq 3$, $0 \leq b \leq 3$, $2 \leq a+b \leq 3$, $0 \leq c \leq 4$, $0 \leq d \leq 4$, $3 \leq c+d \leq 4$, and X is halogen such as Cl Br or I and adducts of these compounds with electron donors. Specific examples are $VOCl_3$, $VO(OCH_3)Cl_2$, $VO(OCH_3)_3$, $VO(OC_2H_5)_{1.5}Cl_{1.5}$, $VO(OC_2H_5)Cl_2$, $VO(OC_2H_5)_2Cl$, $VO(O\text{-iso-}C_3H_7)Cl_2$, $VO(O\text{-iso-}C_3H_7)_2Cl$, $VO(O\text{-iso-}C_3H_7)_{1.5}Cl_{1.5}$, $VO(O\text{-n-}C_3H_7)_{1.5}Cl_{1.5}$, $VO(O\text{-n-}C_3H_7)Cl_2$, $VO(O\text{-n-}C_3H_7)Cl$, $VO)O\text{-}C_5H_{11})_{1.5}Cl_{1.5}$, $VO(O\text{-n-}C_4H_9)Cl_2$, $VO(O\text{-n-}C_4H_9)_2Cl$, $VO(O\text{-iso-}C_4H_9)_2Cl$, $VO(O\text{-sec-}C_4H_9)_3$, $VO(OC_2H_5)_3$, $VOBr_2$, $VCl_4$, $VOCl_2$, $VCl_3$, $VBr_4$, $VBr_3$, $VO(O\text{-n-}C_4H_9)_3$, and $VCl_3 \cdot 20C_8H_{17}OH$.

Compounds having at least one Al—C bond in the molecule can be used as the organoaluminum compound as a catalyst component. Examples are (i) organoaluminum compounds of the general formula

wherein $R^{13}$ and $R^{14}$ are identical or different and each represents a hydrocarbon group having 1 to 15 carbon atoms, preferably 1 to 4 carbon atoms, X represents a halogen atom such as Cl, Br or I, m is a number represented by $0 \leq m \leq 3$, t is a number represented by $0 \leq t < 3$, p is a number represented by $0 \leq t < 3$, and q is a number represented by $0 \leq q < 3$, provided that m+t+p+q=3.

(ii) Complex alkylated compounds of metals of Group I of the periodic table and aluminum which are represented by the following formula

wherein $M^1$ is Li, Na or K, and $R^{15}$ is as defined above.

Examples of the organoaluminum compounds (i) are compounds of the general formula

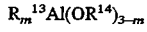

wherein $R^{13}$ and $R^{14}$ are as defined, and m is preferably a number represented by $1.5 \leq m \leq 3$, compounds of the general formula

wherein $R^{13}$ is as defined, X is halogen such as

Cl, Br or I, and m is preferably 0<m<3, compounds of the general formula

wherein $R^{13}$ is as defined, and m is preferably a number represented by $2\leq m<3$, and compounds of the general formula

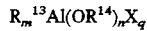

wherein $R^{13}$ and $R^{14}$ are as defined, X is halogen such as Cl, Br or I, $0<m\leq 3$, and $0\leq q<3$, provided that m+n+q=3.

Examples of the aluminum compounds (i) include trialkyl aluminums such as triethyl aluminum, triisopropyl aluminum and tributyl aluminum; dialkyl aluminum alkoxides such as diethyl aluminum ethoxide and dibutyl aluminum butoxide; alkyl aluminum sesquialkoxides such as ethyl aluminum sesquiethoxide and butyl aluminum sesquibutoxide; partially alkoxylated alkyl aluminums having the average composition of $R_{0.5}{}^1Al(OR^2)_{0.5}$; partially halogenated alkyl aluminums, for example dialkyl aluminum halides such as diethyl aluminum chloride, dibutyl aluminum chloride and diethyl aluminum bromide, alkyl aluminum sesquihalides such as ethyl aluminum sesquichloride, butyl aluminum sesquichloride and ethyl aluminum sesquibromide, and alkyl aluminum dihalides such as ethyl aluminum dichloride, propyl aluminum dichloride and butyl aluminum dibromide; partially hydrogenated alkyl aluminums, for example dialkyl aluminum hydrides such as diethyl aluminum hydride and dibutyl aluminum hydride, and alkyl aluminum dihydrides such as ethyl aluminum dihydride and propyl aluminum dihydride; and partially alkoxylated and halogenated alkyl aluminums such as ethyl aluminum ethoxychloride, butyl aluminum butoxychloride and ethyl aluminum aluminum ethoxybromide. As compounds similar to (i), organoaluminum compounds having at least two aluminums bonded through an oxygen or nitrogen atom may also be used. Examples of such compounds are $(C_2H_5)_2AlOAl(C_2H_5)_2$, $(C_4H_9)_2AlOAl(C_4H_9)_2$, and $(C_2H_5)_2AlNAl(C_2H_5)_2$.

Examples of the compounds (ii) are $LiAl(C_2H_5)_4$ and $LiAl(C_7H_{15})_4$.

Among these, the alkyl aluminum halides, alkyl aluminum dihalides and mixtures of these are especially preferred.

The copolymerization reaction in accordance with the process of this invention is carried out in a hydrocarbon medium. Examples of the solvent include aliphatic hydrocarbons having 5 to 15 carbon atoms such as pentane, hexane, heptane, octane and kerosene; alicyclic hydrocarbons having 5 to 15 carbon atoms such as cyclopentane and cyclohexane, methylcyclohexane; and aromatic hydrocarbons having 6 to 15 carbon atoms such as benzene, toluene and xylene. These solvents may be used singly or in combination.

In the process of this invention, the copolymerization reaction is carried out continuously. During the reaction, the ratio of aluminum atoms to vanadium atoms, Al/V, is maintained at 2 or higher, preferably 2 to 50, especially preferably 3 to 20.

The soluble vanadium compound and the organoaluminum compound are fed to the reaction system usually after dilution with the hydrocarbon medium. The concentration of the vanadium compound to be fed to the polymerization reaction system is usually not more than 10 times, preferably 7 to 1 times, more preferably 5 to 1 times, that in the polymerization reaction system. On the other hand, the organoaluminum compound may be fed to the polymerization system after its concentration is adjusted to not more than 50 times that in the polymerization system. In the process of this invention, the concentration of the soluble vanadium compound in the copolymerization reaction system is usually 0.01 to 5 gram-atoms/liter, preferably 0.05 to 3 gram-atoms/liter, as vanadium atoms. In the process of this invention for producing the cycloolefin random copolymer, the copolymerization reaction may be carried out in the copresence of an electron donor in the polymerization reaction system in addition to the soluble vanadium compound and the organoaluminum compound as catalyst ingredients. Examples of the electron donor include oxygen-containing electron donors such as alcohols, phenols, ketones, aldehydes, carboxylic acids, esters of organoc acids or inorganic acids, ethers, acid amides, acid anhydrides and alkoxysilanes, and nitrogen-containing electron donors such as ammonia, amines, nitriles and isocyanates. The copolymerization reaction is carried out usually at $-50°$ to $100°$ C., preferably $-30°$ to $80°$ C., more preferably $-20°$ to $60°$ C. The average residence time in the copolymerization reaction differs depending upon the type of the polymerization material, the concentrations of the catalyst components, and the polymerization temperature. Usually it is 5 minutes to 5 hours, preferably 10 minutes to 3 hours. The pressure during the copolymerization reaction is usually more than 0 to 50 $kg/cm^2$, preferably more than 0 to 20 $kg/cm^2$. If desired, it is carried out in the presence of an inert gas such as nitrogen or argon. To control the molecular weight of the copolymer, a molecular weight controlling agent such as hydrogen may be present in the reaction system. The polymerization reaction mixture after the copolymerization is treated in accordance with conventional methods to give the desired cycloolefin random copolymer.

The mole ratio of ethylene/cycloolefin fed to the copolymerization reaction system in the process of this invention is usually from 99:1 to 1:99, preferably 98:2 to 2:98.

In this invention, the cycloolefin is copolymerized with ethylene. As required, another copolymerized unsaturated monomer within a range which does not impair the objects of the invention, for example in an amount of 50 mole %, preferably 40 mole %, based on the ethylene units in the copolymer may be copolymerized in addition to these two essential components. Specific examples of the other copolymerizable unsaturated monomer include alpha-olefins having 3 to 20 carbon atoms such as propylene, 1-butene, 4-methyl-1-pentene, 1-hexene, 1-octene, 1-decene, 1-dodecene, 1-tetradecene, 1-hexadecene, 1-octadecene, 1-octadecene and 1-eicosane which are to be used in an amount of less than 1 mole per mole of the ethylene units in the resulting random copolymer; and cycloolefins such as cyclopentene, cyclohexene, 3-methylcyclohexene, cyclooctene, 3a,5,6,7a-tetrahydro-4,7-methano-1H-indene, non-conjugated dienes such as 1,4-hexadiene, 4-methyl-1, 4-hexadiene, 5-methyl-1,4-hexadiene, 1,7-octadiene, dicyclopentadiene, 5-ethylidene-2-norbornene and 5-vinyl-2-norbornene, and norbornenes such as norbornene-2, 5-methylnorbornene-2, 5-ethylnorbornene-2, 5-isopropylnorbornene-2, 5-n-butylnorbornene-2, 5-i-butylnorbornene-2, 5,6-dimethylnorbornene-2, 5-chloronorbornene-2, 2-fluoronorbornene-2, and 5,6-dichloronorbornene-2.

The copolymerization reaction in accordance with this invention can be advantageously carried out by continuously feeding ethylene, the cycloolefin, and optionally the other copolymerizable component as materials to be polymerized, the soluble vanadium compound and organoaluminum compound as catalyst components, and the hydrocarbon medium into the polymerization system, and continuously withdrawing the polymerization reaction mixture from the polymerization reaction system.

According to the continuous process of this invention, a random copolymer having a narrow molecular weight distribution and good transparency can be produced.

The resulting copolymer solution continuously withdrawn from the polymerization reaction system is a hydrocarbon medium solution of the random copolymer. The concentration of the random copolymer in the resulting copolymer solution is usually 2.0 to 20.0% by weight, preferably 2.0 to 10.0% by weight. Contacting the resulting copolymer solution with a ketone or alcohol gives a precipitate of the random copolymer. The precipitate is separated by such separating means as filtration or centrifugal separation to give the random copolymer of this invention. The proportion of the ketone or alcohol used is usually 200 to 1,000 parts by weight, preferably 300 to 500 parts by weight, per 100 parts by weight of the resulting copolymer solution. Examples of the ketones are those having 3 to 7 carbon atoms such as acetone, methyl ethyl ketone, diethyl ketone, methyl isobutyl ketone, dipropyl ketone and acetylacetone. Examples of the alcohols are alcohols having 1 to 4 carbon atoms such as methanol, ethanol, propanol, isopropanol, butanol, secbutanol and tert-butanol. The ketones or alcohols may contain a small amount of water. The use of a mixture of the ketone or alcohol with usually 0.1 to 10% by weight, preferably 1 to 5% by weight, of water is suitable since it gives a copolymer powder having low contents of the unreacted cycloolefin monomer and a low-molecular-weight polymer and high bulk density. Contacting of the resulting copolymer solution with the ketone or alcohol is carried out with stirring at a temperature of usually 0° to 100° C. preferably 10° to 70° C., especially preferably at a temperature near the boiling point of the ketone or alcohol. This is effected by using a vessel-type mixer having agitating vanes such as turbine blades and comb blades. The rotating speed of the blades is usually 200 to 2,000 rpm, preferably 800 to 1,500 rpm.

As a result of the after-treatment described above, the random copolymer is precipitated usually in powder form to form a suspension. The suspension containing the copolymer is separated into the copolymer and the mother liquor by such a separating means as centrifugation or filtration. The separated copolymer is further extracted with a ketone to give a random copolymer having low contents of the unreacted cycloolefin monomer and a low-molecular-weight polymer, a narrow molecular weight distribution, a narrow composition distribution, and a high glass transition temperature. The proportion of the ketone used in the extraction is such that the concentration of the copolymer in the ketone is usually 10 to 100 g/liter, preferably 30 to 60 g/liter. The temperature at which the copolymer is contacted with the ketone is usually 10° to 85° C., preferably 15° to 80° C. The contacting treatment between the copolymer and the ketone is usually carried out with stirring using, for example, a vessel-type mixer having agitating blades such as turbine blades and comb blades. The rotating speed of the blades at this time is usually 50 to 400 rpm, preferably 100 to 200 rpm. The time required for contacting is usually 1 to 8 hours, preferably 2 to 5 hours. Examples of the ketone may be the same as those exemplified for the ketone used for the precipitation treatment. The copolymer which has been contacted with the ketone may be separated by such separating means as centrifugation or filtration. As required, the separated copolymer is further washed with the ketone. The washing conditions may be the same as the ketone contacting treatment conditions described above.

The random copolymer of this invention obtained by the above after treatment has a bulk density of usually 0.05 to 0.3, preferably 0.1 to 0.25, and is characterized by the ease of handling at the time of molding. Furthermore, since the copolymers of this invention have low contents of the unreacted cycloolefin monomer and a low-molecular-weight polymer, optical materials, particularly optical memory discs, molded from it permit reduction of noises caused by diffused reflection, etc.

Thus, the present invention gives the random copolymer in which the mole ratio of polymerized units from the cycloolefin of formula (I) to polymerized units from ethylene is in the range of from 3:97 to 60:40. When n in formula (I) is 0, the above mole ratio is preferably from 10:90 to 60:40, more preferably from 15:85 to 50:50. When n in formula (I) is a positive integer, the mole ratio is preferably from 5:95 to 50:50.

The cycloolefin of formula (I) is incorporated in the chain of the random copolymer of this invention as polymerized units of the following formula (II)

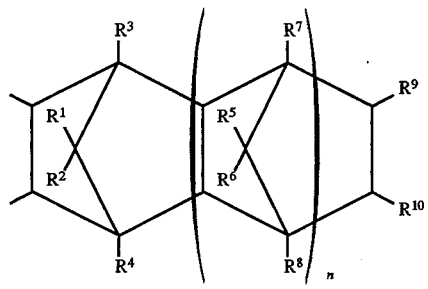

wherein all symbols are as defined hereinabove.

The random copolymer of this invention has an intrinsic viscosity [η], measured in decalin at 135° C., of 0.01 to 20 dl/g, preferably 0.05 to 10 dl/g.

The random copolymer of this invention has a molecular weight distribution ($\overline{Mw}/\overline{Mn}$), measured by gel permeation chromatography (GPC), of not more than 4, preferably not more than 3.5, especially preferably not more than 3. The random copolymer of this invention is characterized in that this molecular weight distribution is narrow. This means that the random copolymer of this invention has a low content of a low-molecular-weight polymer. Accordingly, when the random copolymer of this invention is molded into an optical material such as an optical memory disc or optical fibers, the optical material has good surface smoothness, low surface tack, or good mechanical properties and is suitable for optical applications.

The random copolymer of this invention has a crystallinity, measured by X-ray diffractometry, of 0 to 10%, preferably 0 to 8%, especially preferably 0 to 7%. The advantage of the copolymer having a crystallinity of 10% or below is that when it is molded into an optical material such as an optical memory disc or optical fibers, noises of the optical material caused by refraction, diffused reflection, etc. are reduced.

Where n is 0 in formula (I), the random copolymer of this invention has a glass transition temperature (Tg) of preferably 10° to 130° C., more preferably 20° to 100° C. When n is a positive integer in formula (I), the copolymer has a Tg of preferably 10° to 240° C., more preferably 20° to 200° C.

The novel random copolymers in accordance with this invention are molded by known methods. For example, they can be extrusion-molded, injection-molded, blow-molded, or rotationally molded by using, for example, a vent-type extruder, a twin-screw extruder, a conical twin-screw extruder, a Cokneader, a plasticator, a mixtruder, a twin conical screw extruder, a planetary screw extruder, a gear-type extruder, a screwless extruder, etc. In the molding process, known additives such as heat stabilizers, light stabilizers, antistatic agents, slip agents, antiblocking agents, antihaze agents, lubricants, inorganic and organic fillers, dyes and pigments may be used as required.

Phenolic or sulfur-type antioxidants may be cited as examples of such additives. The phenolic antioxidants include, for example, phenols such as 2,6-di-tert-butyl-p-cresol, stearyl (3,3,-dimethyl-4-hydroxybenzyl) thioglycolate, stearyl beta-(4-hydroxy-3,5-di-tert-butylphenol)propionate, distearyl 3,5-di-tert-butyl-4-hydroxybenzyl phosphate, 2,4,6-tris(3',5'-di-tert-butyl-4'-hydroxybenzylthio)-1,3,5-triazine, distearyl (4-hydroxy-3-methyl-5-tert-butylbenzyl)malonate, 2,2'-methylenebis(4-methyl-6-tert-butylphenol), 4,4'-methylenebis(2,6-di-tert-butylphenol), 2,2'-methylenebis[6-(1-methylcyclohexyl)p-cresol], bis[3,5-bis[4-hydroxy-3-tert-butylphenyl)butyric acid]glycol ester, 4,4'-butylidenebis(6-tert-butyl-m-cresol), 1,1,3-tris(2-methyl-4-hydroxy-5-tert-butylphenyl)butene, bis[2-tert-butyl-4-methyl-6-(2-hydroxy-3-tert-butyl-5-methylbenzyl)phenyl]terephthalate, 1,3,5-tris(2,6-di-methyl-3-hydroxy-4-tert-butyl)benzyl isocyanurate, 1,3,5-tris(3,5-di-tert-butyl-4-hydroxybenzyl)-2,4,6-trimethylbenzene, tetrakis[methylene-3-(3,5-di-tert-butyl-4-hydroxyphenyl)propionate]methane, 1,3,5-tris(3,5-di-tert-butyl-4-hydroxybenzyl) isocyanurate, 1,3,5-tris[(3,5-di-tert-butyl-4-hydroxyphenyl)propionyloxyethyl]isocyanurate, 2-octylthio-4,6-di(4-hydroxy-3,5-di-tert-butyl)phenoxy-1,3,5-triazine and 4,4,'-thiobis(6-tert-butyl-m-cresol); and polyhydric phenol/carbonic acid oligoesters such as carbonic acid oligoesters (for example, having a degree of polymerization of 2, 3, 4, 5, 6, 7, 8, 9, 10) of 4,4'-butylidenebis(2-tert-butyl-5-methylphenol).

Examples of the sulfur-type antioxidant include dialkyl thiodipropionates such as dilauryl, dimyristyl or distearyl thiodipropionate, and esters (such as pentaerythritol tetralaurylthiopropionate) formed between alkylthiopropionic acids such as butyl-, octyl-, lauryl- or stearylthiopropionic acid and polyhydric alcohols (such as glycerol, trimethylolethane, trimethylolpropane, pentaerythritol or tris-hydroxyethyl diisocyanurate).

phosphorous-containing compounds may also be incorporated. Examples include trioctyl phosphite, trilauryl phosphite, tridecyl phosphite, octyldiphenyl phosphite, tris(2,4-di-tert-butylphenyl) phosphite, triphenyl phosphite, tris(butoxyethyl) phosphite, tris(nonylphenyl) phosphite, distearyl pentaerythritol diphosphite, tetra(tridecyl)-1,1,3-tris(2-methyl-5-tert-butyl-4-hydroxyphenyl)butane diphosphite, tetra($C_{12}$–$C_{15}$ mixed alkyl)- 4,4'-isopropylidenediphenyl diphosphite, tetra(tridecyl)-4,4'-butylidenebis(3-methyl-6-tert-butylphenol) diphosphite, tris(3,5-di-tert-butyl-4-hydroxyphenyl) phosphite, tris(mono-di-mixed nonylphenyl) phosphite, hydrogenated 4,4'-isopropylidene diphenol polyphosphite, bis(octylphenyl).bis[4,4'-butylidenebis(3-methyl-6-tert-butylphenol)].1,6-hexanediol diphosphite, phenyl-4,4'-isopropylidenediphenol-pentaerythritol diphosphite, bis(2,4-di-tert-butylphenyl)pentaerythritol diphosphite, bis(2,6-di-tert-butyl-4-methylphenyl)pentaerythritol diphosphite, tris[4,4'-isopropylidenebis(2-tert-butylphenol)]phosphite, phenyldiisodecyl phosphite, di(nonylphenyl)pentaerythritol diphosphite, tris(1,3-di-stearoyloxyisopropyl) phosphite, 4,4'-isopropylidenebis(2-tert-butylphenol)-di(nonylphenyl) phosphite, 9,10-dihydro-9-oxa-10-phosphaphenanthrene-10-oxide, and tetrakis(2,4-di-tert-butylphenyl)-4,4'-biphenylene diphosphonite.

There can also be used 6-hydroxycoumarone derivatives such as alpha-, beta-, gamma- and delta-tocopherols and mixtures thereof, a 2,5-dimethyl-substitution product, 2,5,8-trimethyl-substituted product or 2,5,7,8-tetramethyl-substituted product of 2-(4-methyl-pent-3-eny)-6-hydroxycoumarone, 2,2,7-trimethyl-5-tert-butyl-6-hydroxycoumarone, 2,2,5-trimethyl-7-tert-butyl-6-hydroxycoumarone, 2,2,5-trimethyl-6-tert-butyl-6-hydroxycoumarone, and 2,2-dimethyl-5-tert-butyl-6-hydroxycoumarone.

It is also possible to incorporate a compound represented by the general formula

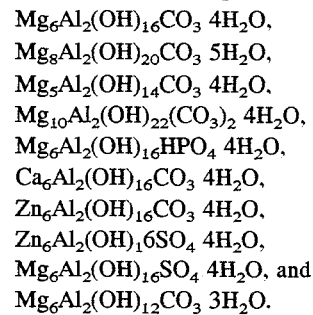

wherein M represents Mg, CA or Zn, A is an anion other than a hydroxyl anion, x, y and z are positive numbers, and a represents 0 or a positive number.

Examples of the compounds of the above formula are $Mg_6Al_2(OH)_{16}CO_3\ 4H_2O$, $Mg_8Al_2(OH)_{20}CO_3\ 5H_2O$, $Mg_5Al_2(OH)_{14}CO_3\ 4H_2O$, $Mg_{10}Al_2(OH)_{22}(CO_3)_2\ 4H_2O$, $Mg_6Al_2(OH)_{16}HPO_4\ 4H_2O$, $Ca_6Al_2(OH)_{16}CO_3\ 4H_2O$, $Zn_6Al_2(OH)_{16}CO_3\ 4H_2O$, $Zn_6Al_2(OH)_{16}SO_4\ 4H_2O$, $Mg_6Al_2(OH)_{16}SO_4\ 4H_2O$, and $Mg_6Al_2(OH)_{12}CO_3\ 3H_2O$.

There may also be added an antioxidant having a 2-benzofuranone skeleton, such as 3-phenyl-2-benzofuranone and 3-phenyl-4,6-di-t-butyl-2-benzofuranone as disclosed in the specification of Japanese Laid-Open Patent Publication No. 501,181/1980.

Examples of the light stabilizers include hydroxybenzophenones such as 2-hydroxy-4-methoxybenzophenone, 2-hydroxy-4-n-octoxybenzophenone, 2,2'-dihydroxy-4-methoxybenzophenone and 2,4-dihydroxybenzophenone; benzotriazoles such as 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-5'-methylphenyl)benzotriazole and 2-(2'-hydroxy-3',5'-di-tert-amylphenyl)benzotriazole; benzoates such as phenyl salicylate, p-tert-butylphenyl salicylate, 2,4-di-tert-butylphenyl-3,5-di-tert-butyl-4-hydroxybenzoate and hexadecyl-3,5-di-tert-butyl-4-hydroxybenzoate; nickel compounds such as 2,2'-thiobis(4-tert-octylphenol) nickel salt, [2,2'-thiobis(4-tert-octylphenolate)]-n-butylamine nickel salt and (3,5-di-tert-butyl-4-hydroxybenzyl)-phosphonic acid monoethyl ester nickel salt; substituted acrylonitriles such as methyl alpha-cyano-beta-methyl-beta-(p-methoxyphenyl)acrylate; oxalic acid dianilides such as N'-2-ethylphenyl-N-ethoxy-5-tert-butylphenyl oxalic acid diamide and N-2-ethylphenyl-N'-2-ethoxyphenyl oxalic acid diamide; and hindered amine compounds such as bis(2,2,6,6-tetramethyl-4-piperidine)sebacate, poly[(6-(1,1,3,3-tetramethylbutyl)imino)-1,3,5-triazine-2,4-diyl 4-(2,2,6,6-tetramethylpiperidyl)imino)hexamethylene] and a condensation product of dimethyl succinate and 2-(4-hydroxy-2,2,6,6-tetramethyl-1-piperidyl)ethanol.

Examples of the lubricants include aliphatic hydrocarbons such as paraffin wax, polyethylene wax and polypropylene wax; higher fatty acids such as capric acid, lauric acid, myristic acid, palmitic acid, margaric acid, stearic acid, arachidic acid and behenic acid; metal salts of higher fatty acids such as lithium, calcium, sodium, magnesium and potassium salts of the above-exemplified fatty acids; aliphatic alcohols such as palmityl alcohol, cetyl alcohol and stearyl alcohol; aliphatic amides such as caproic amide, caprylic amide, capric amide, lauric amide, myristic amide, palmitic amide and stearic amide; esters formed between fatty acids and alcohols; and fluorine compounds such as fluoroalkylcarboxylic acids metal salts thereof, and metal salts of fluoroalkyl-sulfonic acids.

Examples of the fillers include inorganic or organic fibrous fillers such as glass fibers, silver- or aluminum-coated glass fibers, stainless steel fibers, aluminum fibers, potassium titanate fibers, carbon fibers, whiskers, Kevlar® fibers and superhigh elastic polyethylene fibers; and inorganic or organic powdery, granular or flaky fillers such as talc, calcium carbonate, magnesium hydroxide, calcium oxide, magnesium sulfate, graphite, nickel powder, silver powder, copper powder, carbon black, silver-coated glass beads, aluminum-coated glass beads, aluminum flakes, stainless steel flakes and nickel-coated graphite.

The random copolymers of this invention have excellent transparency, heat resistance, heat aging resistance, chemical resistance, solvent resistance, dielectric properties and mechanical properties, a narrow and uniform molecular weight distribution, and a narrow and uniform composition distribution. Accordingly, those having a low molecular weight are synthetic waxes and are useful as candles, impregnating agents for matches, paper finishing agents, sizes, antioxidants for rubber, water-proofing agents for cardboards, slow releasing agents for chemical fertilizers, heat accumulators, binders for ceramics, paper condensers, electric insulating materials for electric wires and cables, agents for decelerating neutrons, fiber finishing aids, water-repellents for building materials, protecting agents for coatings, polishing agents, thixotropy imparting agents, core hardening agents for pencils and crayons, carbon ink substrates, electrophotographic toners, lubricants and releasing agents for molding of synthetic resins, resin coloring agents, hot-melt adhesives, and lubricant greases. Those having a high molecular weight can be used in an optical field as optical lenses, optical discs, optical fibers and windowpanes, in an electrical field as a water tank for electrical irons, parts of electronic ovens, base boards for liquid crystal display, base boards for printed circuit boards, high frequency circuit boards and transparent electrically conductive sheets or films, in medical and chemical fields as syringes, pipettes and animal gages, and in other various fields as housings of measuring instruments, and helmets.

When the copolymers of this invention having a glass transition temperature (Tg) below 100° C., they can be used in a field utilizing their shape memory, and as a vibration controlling material or a tube. Specifically, they can be used as joints for irregularly-shaped pipes, laminating agents for the interior and exterior parts of pipes and rods, clamping pins for optical fiber connectors, plaster casts, containers, automobile bumpers, various space eliminating materials, vibration controlling materials or sound insulating materials in the form of a laminate with a metal surface material, and tubes for use in medical therapy.

The novel random copolymers of this invention may be used as a blend with various known polymers. Examples of such known polymers are shown below.

(A) Polymers derived from hydrocarbons having 1 or 2 unsaturated bonds

Polyolefins, such as polyethylene, polypropylene, polyisobutylene, poly(methylbutene-1), poly(4-methylpentene-1), poly(butene-1), polyisoprene, polybutadiene and polystyrene, or crosslinked products thereof.

Copolymers of the monomers constituting the above polymers with each other, such as ethylene/propylene copolymer, propylene/butene-1 copolymer, propylene/isobutylene copolymer, styrene/isobutylene copolymer, styrene/butadiene copolymer, terpolymers of ethylene, propylene and dienes such as hexadiene, bicyclopentadiene and 5-ethylidene-2-norbornene, and terpolymers of ethylene, butene-1 and dienes such as hexadiene, dicyclopentadiene and 5-ethylidene-2-norborne.

Blends, grafted polymers, and block copolymers of these polymers may also be cited.

(B) Halogen-containing vinyl polymers

Polyvinyl chloride, polyvinylidene chloride, polyvinyl fluoride, polychloroprene, and chlorinated rubbers.

(C) Polymers derived from alpha,beta-unsaturated carboxylic acids or the derivatives thereof Polyacrylate, polymethacrylate, polyacrylamide, and polyacrylonitrile.

Copolymers of the monomers constituting the above-exemplified polymers with other copolymerizable monomers, such as acrylonitrile/butadiene/styrene copolymer, acrylonitrile/styrene copolymer, and acrylonitrile/styrene/acrylate copolymer.

(D) Polymers derived from unsaturated alcohols, amines, acyl derivatives thereof, or acetals Polyvinyl alcohol, polyvinyl acetate, polyvinyl stearate, polyvinyl benzoate, polyvinyl maleate, polyvinyl butyral, polyallyl phthalate and polyallylmelamine.

Copolymers of the monomers constituting the above-exemplified polymers with other copolymerizable monomers, such as ethylene/vinyl acetate copolymer.

(E) Polymers derived from epoxides

Polyethylene oxide and polymer derived from bisglycidyl ether.

(F) Polyacetals

Polyoxymethylene, polyoxyethylene, and polyoxymethylene containing ethylene oxide.

(G) Polyphenylene oxide (H) polycarbonate (I) Polysulfone (J) Polyurethane and urea resins (K) Polyamides and copolyamides derived from diamines and dicarboxylic acids and/or aminocarboxylic acids or the corresponding lactams Nylon 6, nylon 66, nylon 11, and nylon 12.

(L) Polyamide-polyethers (M) Polyesters derived from dicarboxylic acids and dialcohols and/or hydroxycarboxylic acids or the corresponding lactones Polyethylene terephthalate, polybutylene terephthalate and poly(1,4-dimethylolcyclohexane terephthalate).

(N) Crosslinked polymers derived from aldehydes and phenols, urea or melamine

Phenol/formaldehyde resin, urea/formaldehyde resin, and melamine/formaldehyde resin.

(O) Alkyd resins

Glycerin/phthalic acid resin.

(P) Unsaturated polyester resins derived from copolyesters of saturated and unsaturated dicarboxylic acids and polyhydric alcohols using vinyl compounds as crosslinking agents, and halogen-containing modified resins thereof.

(Q) Natural polymers

Cellulose, rubber and protein, or derivatives thereof, such as cellulose acetate, cellulose propionate, and cellulose ether.

When the copolymers of this invention are used as synthetic waxes, they may, of course, be mixed with various known waxes.

The random copolymers of this invention may be used as a blend with each other.

The random copolymer of this invention may be modified by grafting thereto a monomer selected from the group consisting of (a) alpha, beta-unsaturated carboxylic acids and/or their derivatives, (b) styrenes, (c) organic silicon compounds having an olefinic unsaturated bond and a hydrolyzable group and (d) unsaturated epoxy compounds. The modified random copolymer obtained has the same excellent properties as the random copolymer of the invention and also especially good adhesion to metals and synthetic resins and good compatibility with other resins. The amount of the grafting monomer in the modified random copolymer is usually 0.1 to 50 parts by weight, preferably 0.5 to 35% by weight, per 100 parts by weight of the random copolymer of the invention. The modified random copolymer has an intrinsic viscosity [η] of usually 0.03 to 20 dl/g, preferably 0.05 to 5 dl/g.

Examples of the grafting monomer are as follows:

Examples of the unsaturated carboxylic acids and their derivatives (a) include unsaturated carboxylic acids such as acrylic acid, methacrylic acid, alphaethylacrylic acid, maleic acid, fumaric acid, itaconic acid, citraconic acid, tetrahydrophthalic acid, methyltetrahydrophthalic acid, endocis-bicyclo[2.2.1]-hept-5-ene-2,3-dicarboxylic acid (Nadic acid®), and methylendocis-bicyclo[2.2.1]-hept-5-ene-2,3-dicarboxylic acid (methylNadic acid®), and their halides, amides, imides, anhydrides and esters. Specific examples of these derivatives are malenyl chloride, maleimide, maleic anhydride, citraconic anhydride, monomethyl maleate and dimethyl maleate. Of these, the unsaturated dicarboxylic acids or their anhydrides are preferred. Maleic acid, Nadic acid or their anhydrides are especially preferred.

Examples of the styrenes (b) are compounds represented by the following formula

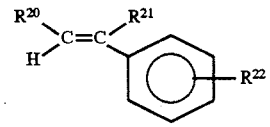

wherein $R^{20}$, $R^{21}$ and $R^{22}$ each represent a hydrogen atom or a lower alkyl group. Specific examples are styrene, alpha-methylstyrene, o-methylstyrene, m-methylstyrene, p-methylstyrene, m-ethylstyrene, p-ethylstyrene, o-isopropylstyrene, m-isopropylstyrene and p-isopropylstyrene. Of these, styrene, m-methylstyrene and p-methylstyrene are preferred.

Examples of the organic silicon compound (c) having an olefinic unsaturated bond and a hydrolyzable group are compounds represented by the following formula

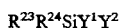

wherein $R^{23}$ and $R^{24}$ are identical or different and each represents a monovalent group composed of carbon, hydrogen and optionally oxygen and having an olefinically unsaturated bond, and $Y^1$ and $Y^2$ are identical or different and each represents a hydrolyzable group, compounds of the following formula

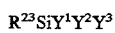

wherein $R^{23}$ is as defined, and $Y^1$, $Y^2$ and $Y^3$ are identical and different and each represents a hydrolyzable group, and compounds of the following formula

wherein $R^{23}$, $Y^1$ and $Y^2$ are as defined above, and X represents an organic group free from an olefinic unsaturated bond.

Examples of $R^{23}$ and $R^{24}$ are vinyl allyl, butenyl, cyclohexenyl, cyclopentadienyl, $CH_2=C(CH_3)$—COOO$(CH_2)_3$—, $CH_2=C(CH_3)COO(CH_2)_2$—O—$(CH_2)_3$—, and $CH_2=C(CH_3)COOCH_2OCH_2CH(OH)CH_2O(CH_2)_3$—. Of these, the hydrocarbon groups having a terminal olefinically unsaturated bond and esters thereof are preferred. The vinyl group is especially preferred.

Examples of $Y^1$, $Y^2$ and $Y^3$ are alkoxy groups such as methoxy, ethoxy, butoxy and methoxyethoxy, acyloxy groups such as formyloxy, acetoxy and propionoxy, oxime groups such as —ON=C(CH$_3$)$_2$, —ON=CHCH$_2$C$_2$H$_5$ and —ON=C(C$_6$H$_5$)$_2$, and substituted amino groups and arylamino groups such as —NHCH$_3$, —NHC$_2$H$_3$ and —NH(C$_6$H$_3$).

Examples of X in the above formula include methyl, ethyl, propyl, tetradecyl, octadecyl, phenyl, benzyl and tolyl. Of these, monovalent hydrocarbon groups are preferred.

Organic silicon compounds preferably used in this invention are those of the second formula given above, particularly those in which the groups $Y^1$, $Y^2$ and $Y^3$ are identical. Especially preferred are vinyltrialkoxysilanes such as vinyltrimethoxysilane, vinyltriethoxysilane, vinyltris(methoxyethoxy)silane, vinylmethyldiethoxysilane and vinylphenyldimethoxysilane.

The unsaturated epoxy monomers (d) are preferably monomers having at least one polymerizable unsaturated bond and at least one epoxy group per molecule. Examples include unsaturated glycidyl esters represented by the following general formula

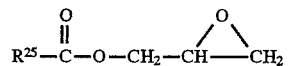

wherein $R^{25}$ represents a hydrocarbon group having a polymerizable ethylenically unsaturated bond, unsaturated glycidyl ethers represented by the general formula

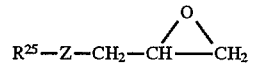

wherein $R^{25}$ is as defined above, and Z represents a divalent group of the formula —CH$_2$—O— or

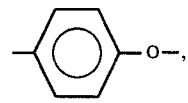

and epoxyalkenes represented by the general formula

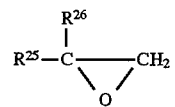

wherein $R^{25}$ is as defined, and $R^{26}$ represents a hydrogen atom or a methyl group.

Specific examples of the monomers (d) are glycidyl acrylate, glycidyl methacrylate, mono- and di-glycidyl itaconate, mono-, di- and-triglycidyl butenetricarboxylates, mono- and di-glycidyl citraconates, mono - and di-glycidyl endo-cis-bicyclo[2.2.1]-hept-5-ene-2,3-carboxylates, mono- and di-glycidyl endo-cis-bicyclo-[2.2.1]-hept-5-ene-2-methyl-2,3-dicarboxylates, mono- and di-glycidyl allylsuccinates, glycidyl p-styrenecarboxylate, allyl glycidyl ether, 2-methylalkyl glycidyl ether, styrene p-glycidyl ether, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene, and vinylcyclohexene monoxide. Of these, glycidyl acrylate and glycidyl methacrylate are preferred.

The modified random copolymer may be produced by various known methods. For example, the random copolymer is melted, and the grafting monomer is added and graft-copolymerized. Alternatively, the random copolymer is dissolved in a solvent, and the grafting monomer is added and graft-copolymerized. In either case, the reaction is preferably carried out in the presence of a radical initiator in order to perform graft copolymerization efficiently. The radical initiator may include organic peroxides, organic peresters and azo compounds. Ionizing radiations and ultraviolet light may also be used to generate radicals.

The modified random copolymer obtained by the above procedure has excellent heat resistance as shown by its high glass transition temperature which is one measure of heat resistance. Specifically, the modified random copolymer has a glass transition temperature, measured by a dynamic modulus analyzer (DMA), of usually 20° to 250° C., in many cases 30° to 220° C. The modified random copolymer also has a softening temperature of usually 20° to 230° C., in many cases 30° to 200° C. The softening temperature is defined as the temperature at which a quartz needle (diameter 0.635 mm) penetrated 0.1 mm into the copolymer under a load of 49 g when the temperature is elevated at a rate of 5° C./min. using TMS (thermomechanical analyzer, a product of E. I. du Pont de Nemours & Co.).

The modified copolymer has a density, determined by the method of ASTM D 1505, of usually 0.95 to 1.20 g/cm$^3$, in many cases 0.96 to 1.10 g/cm$^3$.

When the random copolymer of this invention is crosslinked with sulfur or organic peroxides or by actinic light such as electron beams or radioactive rays, its heat resistance, chemical resistance, solvent resistance and mechanical properties can be further improved.

The properties of the cycloolefin random copolymers obtained in this invention were measured in accordance with the following method.

(1) Copolymer composition (mole %)

On the basis of the cycloolefin unit content of the random copolymer determined by $^{13}C$-NMR (200 MHz), a calibration curve is prepared between the cycloolefin unit content and the height of the peak of an absorption band based on the cycloolefin unit determined by infrared spectroscopy. The peak height of the absorption band of the infrared absorption spectrum of the random copolymer is measured, and the cycloolefin unit content is calculated. The ethylene unit content of the random copolymer is calculated by subtracting the cycloolefin unit content from the entire units.

(2) Intrinsic viscosity [η]

Measured at 135° C. using a Ubbelohde viscometer.

(3) Glass transition temperature (Tg)

Measured by a Dynamic Mechanical Analyzer (DMA, made by E. I. du Pont de Nemours & Co.).

(4) Crystallinity

Determined by X-ray diffractometry.

(5) Volatile component (VM)

A weight change was measured under the conditions of 300° C., 1 torr and 1 hour.

(6) Content of the unreacted cycloolefin

The polymer was dissolved in cyclohexane, and the amount of the unreacted cycloolefin was measured by gas chromatography.

(7) Molecular weight distribution

The molecular weight distribution ($\overline{Mw}/\overline{Mn}$) is determined in the following manner in accordance with the procedure described at pages 14–114 of "Gel Permeation chromatography" by Takeuchi, published on May 20, 1976 by Maruzen Co., Ltd., Tokyo.

(1) Using standard polystyrene of a known molecular-weight (mono-dispersed polystyrene, a product of Toyo Soda Mfg. Co., Ltd., Japan), the molecular weight M of the polystyrene sample and its GPC (gel permeation chromatography) count are measured. A calibration curve for the molecular weight M and the EV (elution volume) is drawn. The concentration of the polymer at this time is set at 0.02% by weight.

(2) A gel permeation chromatogram of the sample is taken by the GPC measuring method, and the number average molecular weight $$\left( Mn = \frac{\Sigma MiNi}{\Sigma Ni} \right)$$

and the weight average molecular weight $$\left( Mw = \frac{\Sigma Mi^2Ni}{\Sigma MiNi} \right)$$

are calculated for copolymer by (1) above, and the value ($\overline{Mw}/\overline{Mn}$) is determined.

The sample is prepared under the following conditions, and the conditions for GPC are as shown below.
Preparation of the sample (a) The sample is taken into an Erlenmeyer flask together with o-dichlorobenzene so as to provide a 0.02% solution.

(b) Into the Erlenmeyer flask containing the sample is added 0.1% by weight, based on the polymer solution, of 2,6-di-tert.-butyl-p-cresol as an antioxidant.

(c) The Erlenmeyer is heated to 140° C., and the contents are stirred for about 30 minutes to dissolve the polymer and the antioxidant.

(d) Then, at 135° to 140° C., the solution is filtered by a 1η Millipore filter.

(e) The filtrate is subjected to gel permeation chromatography.

Conditions for gel permeation chromatography (a) Device: Model 150C, made by Waters Company (b) Column: TSK-GMH6 (mix type) made by Toyo Soda Mfg. Co., Ltd.

(c) Amount of the sample: 500 μl (d) Temperature: 140° C.

(e) Flow rate: 1 ml/min.

(f) Total theoretical stages of the column; $1\times10^4$ to $4\times10^4$ (measured with acetone)

The following examples illustrate the present invention more specifically.

EXAMPLE 1

Ethylene and 1,4,5,8-dimethano-1,2,3,4,4a,5,8,8a-octahydronaphthalene [Table 1, (a); abbreviated as DMON] were copolymerized in a 2-liter polymerization reactor equipped with agitating blades.

The polymerization reactor was continuously charged at its top with a cyclohexane solution of DMON at a rate of 0.4 liter/hour so as to provide a DMON concentration of 60 g/liter in the polymerization reactor, a cyclohexane solution of VO(OC$_2$H$_5$)Cl$_2$ as a catalyst at a rate of 0.7 liter/hour so as to provide a vanadium concentration of 0.7 mmole/liter in the polymerization reactor (the concentration of vanadium fed at this time was 2.86 times that in the polymerization reactor), a cyclohexane solution of ethyl aluminum sesquichloride as a catalyst at a rate of 0.4 liters/hour so as to provide an aluminum concentration of 5.6 mmoles/liter in the polymerization reactor, and 0.5 liters/hr of cyclohexane. In the meantime, the polymerization mixture in the polymerization reactor was withdrawn continuously from the bottom of the polymerization reactor so that the amount of the polymerization mixture in the reactor was always kept at 1 liter. Furthermore, 80 liters/hr of ethylene, 80 liters/hr of nitrogen and 0.2 liter/hr of hydrogen were fed from the top of the polymerization reactor. The copolymerization was carried out at 10° C. by circulating a cooling medium into a jacket fitted to the exterior portion of the reactor. As a result of the copolymerization reaction under the above conditions, a polymerization reaction mixture containing the ethylene/DMON random copolymer was obtained. A mixture of cyclohexane and isopropanol (1:1) was added to the polymer solution withdrawn from the bottom of the polymerization reactor to stop the polymerization reactor. Thereafter, an aqueous solution composed of 1 liter of water and 5 ml of concentrated hydrochloric acid and the polymer solution were contacted at a ratio of 1:1 with strong stirring by a homomixer to transfer the catalyst residue to the aqueous layer. The mixture was left to stand, and the water layer was removed. The residue was washed twice with distilled water to purify and separate the polymer solution. The polymer solution was contacted with 3 times its amount of acetone with strong stirring, and the solid portion was collected by filtration and fully washed with acetone. Thereafter, the resulting solid portion was put into acetone in a concentration of 40 g/liter, and reacted at 60° C. for 2 hours. The solid portion was then collected by filtration, and dried in a stream of nitrogen at 130° C. and 350 mmHg for 24 hours.

By the above procedure, the ethylene/DMON copolymer was obtained at a rate of 94 g/hr. The copolymer had an ethylene content of 61.3 mole %, an intrinsic viscosity of 0.85, an $\overline{Mw}/\overline{Mn}$, determined by GPC, of 2.50, a crystallinity, determined by X-ray diffractometry, of 0%, and a glass transition temperature (Tg) of 143° C. The copolymer contained 0.4% by weight of volatile components and 0.13% by weight of the unreacted monomers.

EXAMPLES 2–14

Example 1 was repeated except that the copolymerization conditions indicated in Table 2 were used. The properties of the resulting copolymers are shown in Table 3.

TABLE 1

| | Cycloolefin | |
|---|---|---|
| (a) | | 1,4,5,8-dimethano-1,2,3,4,4a,5,8,8a-octahydronaphthalene |
| (b) | C$_2$H$_5$ | 2-ethyl-1,4,5,8-dimethano-1,2,3,4,4a,5,8,8a-octahydronaphthalene |
| (c) | CH$_3$, CH$_3$ | 2,3-dimethyl-1,4,5,8-dimethano-1,2,3,4,4a,5,8,8a-octahydronaphthalene |
| (d) | CH$_3$ | 2-methyl-1,4,5,8-dimethano-1,2,3,4,4a,5,8,8a-octahydronaphthalene |
| (e) | CH$_3$ | 12-methylhexacyclo[6,6,1,1$^{3,6}$,1$^{10,13}$,0$^{2,7}$,0$^{9,14}$]-4-heptadecene |

TABLE 2

| | | Cycloolefin[3] | | Vanadium compound | | Aluminum compound | | | | |
|---|---|---|---|---|---|---|---|---|---|---|
| Example | Name | Concentration in the reactor (g/l) | Name | Concentration in the reactor (mmol/l) | Name | Concentration in the reactor (mmol/l) | Amount of ethylene fed (l/hr) | Amount of hydrogen fed (l/hr) | Polymerization temperature (°C.) |
| 1 | Table 1 (a) | 60 | $VO(OC_2H_5)Cl_2$ | 0.7 | $Al(C_2H_5)_{1.5}Cl_{1.5}$ | 5.6 | 80 | 0.2 | 10 |
| 2 | Table 1 (b) | " | " | " | " | " | " | " | " |
| 3 | Table 1 (c) | " | " | " | " | " | " | " | " |
| 4 | Table 1 (d) | " | " | " | " | " | " | " | " |
| 5 | Table 1 (d) | " | " | " | " | " | 90 | " | " |
| 6 | Table 1 (e) | " | " | " | " | " | 80 | " | " |
| 7 | Table 1 (a) | " | " | " | " | 2.8 | " | " | " |
| 8[*1)] | Table 1 (a) | " | " | " | " | 5.6 | 90 | 30 | " |
| 9 | Table 1 (a) | " | " | " | " | 7.0 | 80 | 0.2 | " |
| 10 | Table 1 (a) | 30 | " | " | " | 5.6 | 110 | 4 | 20 |
| 11 | Table 1 (a) | " | " | " | " | " | " | 10 | " |
| 12[*2)] | Table 1 (a) | " | " | " | " | " | 150 | 150 | 30 |
| 13 | Table 1 (a) | 60 | $VOCl_3$ | " | " | " | 80 | 0.2 | 10 |
| 14 | Table 1 (a) | " | $VO(OC_2H_5)Cl_2$ | " | $Al(C_2H_5)_{1.5}Cl_{1.5}$/ $Al(C_2H_5)Cl_2$ (7/3) | 4.2 | " | " | " |

[*1)]The amount of nitrogen fed was 50 liters/hr.
[*2)]Nitrogen was not fed.
[*3)]Table 4

TABLE 3

| | Properties of the copolymer | | | | | | | |
|---|---|---|---|---|---|---|---|---|
| Example | Amount of the copolymer (g/hr) | Ethylene content (mol %) | [η] | Crystallinity (%) | DMA-Tg (°C.) | $\overline{M_w}/\overline{M_n}$ | VM (wt %) | Amount of the residual monomer (wt %) |
| 1 | 104 | 61.3 | 0.85 | 0 | 143 | 2.5 | 0.4 | 0.13 |
| 2 | 96 | 64.8 | 0.82 | 0 | 135 | 2.3 | 0.5 | 0.12 |
| 3 | 94 | 63.2 | 0.83 | 0 | 140 | 2.6 | 0.4 | 0.12 |
| 4 | 102 | 64.0 | 0.84 | 0 | 147 | 2.4 | 0.5 | 0.12 |
| 5 | 122 | 70.2 | 0.91 | 0 | 127 | 2.7 | 0.5 | 0.13 |
| 6 | 84 | 67.6 | 0.57 | 0 | 155 | 2.9 | 0.6 | 0.21 |
| 7 | 78 | 61.2 | 0.89 | 0 | 152 | 2.3 | 0.5 | 0.12 |
| 8[*1)] | 120 | 67.2 | 0.20 | 0 | 131 | 3.0 | 0.3 | 0.11 |
| 9 | 90 | 60.3 | 0.70 | 0 | 137 | 2.7 | 0.6 | 0.15 |
| 10 | 102 | 83.7 | 0.40 | 0 | 76 | 2.5 | 0.5 | 0.11 |
| 11 | 100 | 82.9 | 0.35 | 0 | 79 | 2.4 | 0.5 | 0.14 |
| 13 | 96 | 56.7 | 0.71 | 0 | 160 | 2.9 | 0.3 | 0.10 |
| 14 | 106 | 58.0 | 0.67 | 0 | 145 | 2.4 | 0.4 | 0.12 |

EXAMPLE 15

Using a 2-liter glass polymerization reactor equipped with agitating blades, ethylene and 2-methyl-1,4,5,8-dimethano-1,2,3,4,4a,5,8,8a-octahydronaphthalene (to be abbreviated as M-DMON; (d) of Table 1 were copolymerized continuously.

Specifically, the reactor was charged at its top with 0.9 liter/hr of a toluene solution of M-DMON so as to provide an M-DMON concentration in the reactor of 60 g/liter, 0.7 liter/hr of a toluene solution of $VO(OC_2H_5)Cl_2$ as a catalyst so as to provide a vanadium concentration in the reactor of 0.5 mmole/liter, and 0.4 liter/hr of a toluene solution of ethyl aluminum sesquichloride as a catalyst so as to provide an aluminum concentration in the reactor of 2 mmoles/liter. In the meantime, the polymer solution was continuously withdrawn from the bottom of the reactor so that the amount of the polymer solution in the reactor was maintained always at 1 liter. Furthermore, 35 liters/hr of ethylene and 80 liters/hr of nitrogen and 0.2 liter/hr of hydrogen were fed from the top of the reactor. The copolymerization reaction was carried out at 10° C. by circulating a cooling medium through a jacket fitted to the outside of the reactor. As a result of performing the copolymerization under the aforesaid conditions, a polymerization reaction mixture containing an ethylene/M-DMON random copolymer was obtained. A small amount of methanol was added to the polymer solution withdrawn from the bottom of the reactor to stop the copolymerization reaction. The polymer solution was then put into a large amount of acetone/methanol to precipitate the resulting copolymer. The copolymer was fully washed with acetone and dried under reduced pressure for one day at 80° C. By the above operation, the ethylene/M-DMON random copolymer was obtained at a rate of 60 g/hour.

The copolymer was found to have an ethylene content of 63 mole %. The copolymer had an intrinsic viscosity, measured in decalin at 135° C., of 0.92, an iodine number of 1.0, a crystallinity, determined by X-ray diffractometry, of 0%, and a transparency, determined by a haze meter on a 1 mm sheet sample in accordance with ASTM D 1003-52, of 3.1%.

The glass transition temperature Tg of the copolymer, determined from the peak temperature of the loss modulus E" which was measured at a temperature elevation rate of 5° C./min. by a dynamic mechanical analyzer was 127° C. Its melting point Tm was measured within a temperature range of −120° to 400° C. by DSC (Du Pont 990 type at a temperature elevation rate of 10° C./min.). No melting curve (peak) was observed.

EXAMPLES 16–24 AND COMPARATIVE EXAMPLE 1

Example 15 was repeated except that the copolymerization conditions shown in Tables 4 and 5 were used. The properties of the resulting copolymers are shown in Table 5. In Example 22, a 1:1 mixture of toluene and cyclohexane was used as the polymerization solvent.

TABLE 4

| | Cycloolefin | | Catalyst | | | |
|---|---|---|---|---|---|---|
| | | | Vanadian compound | | Aluminum compound | |
| Example | Name | Concentration in the reactor (g/l) | Name | Concentration in the reactor (mmol/l) | Name | Concentration in the reactor (mmol/l) |
| 15 | Table 1 (d) | 60 | VO(OC$_2$H$_5$)Cl$_2$ | 0.5 | Al(C$_2$H$_5$)$_{1.5}$Cl$_{1.5}$ | 2.0 |
| 16 | Table 1 (d) | " | " | " | " | " |
| 17 | Table 1 (d) | " | " | " | " | " |
| 18 | Table 1 (d) | " | " | 0.8 | " | 6.4 |
| 19 | Table 1 (d) | " | VOCl$_3$ | " | " | " |
| 20 | Table 1 (d) | 6 | VO(OC$_2$H$_5$)Cl$_2$ | 0.5 | " | 4.0 |
| 21 | Table 1 (b) | 60 | " | 0.8 | " | 6.4 |
| 22 | Table 1 (c) | " | " | " | " | " |
| 23 | Table 1 (a) | " | " | " | " | " |
| 24 | Table 1 (e) | " | " | " | " | " |
| Comp Ex. 1 | Table 1 (d) | 60 | " | 0.8 | " | 0.8 |

TABLE 5

| Example | Amount of ethylene fed (l/hr) | Polymerization temperature (°C.) | Amount of the copolymer yielded (l/hr) | Properties of the copolymer | | | | | | |
|---|---|---|---|---|---|---|---|---|---|---|
| | | | | Ethylene content (mole %) | [η] | Iodine value | Crystallinity (%) | Haze (%) | DMA-Tg (°C.) | DSC-Tm (°C.) | Mw/Mn |
| 15 | 35 | 10 | 60 | 63 | 0.52 | 1.0 | 0 | 3.1 | 127 | — | 2.5 |
| 16 | 60 | " | 94 | 66 | 0.75 | 0.9 | 0 | 2.7 | 118 | — | 2.8 |
| 17 | 100 | " | 140 | 72 | 1.10 | 0.9 | 0 | 2.0 | 107 | — | 3.6 |
| 18 | 60 | " | 106 | 68 | 0.77 | 0.7 | 0 | 2.2 | 116 | — | 2.8 |
| 19 | " | " | 92 | 67 | 0.79 | 0.9 | 0 | 2.3 | 115 | — | 2.9 |
| 21 | 60 | 10 | 90 | 67 | 0.75 | 0.9 | 0 | 2.6 | 113 | — | 2.8 |
| 22 | " | " | 86 | 66 | 0.79 | 0.8 | 0 | 2.3 | 117 | — | 3.0 |

TABLE 5-continued

| Example | Amount of ethylene fed (l/hr) | Polymerization temperature (°C.) | Amount of the copolymer yielded (l/hr) | Properties of the copolymer | | | | | | | |
|---|---|---|---|---|---|---|---|---|---|---|---|
| | | | | Ethylene content (mole %) | [η] | Iodine value | Crystallinity (%) | Haze (%) | DMA-Tg (°C.) | DSC-Tm (°C.) | $\bar{M}w/\bar{M}n$ |
| 23 | " | " | 92 | 65 | 0.79 | 0.9 | 0 | 2.4 | 115 | — | 2.9 |
| 24 | " | " | 78 | 69 | 0.68 | 1.0 | 0 | 2.8 | 131 | — | 2.5 |
| Comp. Ex. 1 | 60 | 10 | trace | — | — | — | — | — | — | — | — |

EXAMPLE 25

Using a 2-liter polymerization reactor equipped with agitating blades, ethylene and 6-ethylbicyclo[2.2.1]-hept-2-ene ((f) of Table 6; to be abbreviated as MBH) were continuously copolymerized.

Specifically, the reactor was continuously charged at its top with 0.9 liter/hr of a toluene solution of MBH so as to provide an MBH concentration in the reactor of 60 g/liter, 0.7 liter/hr of a toluene solution of $VO(OC_2H_5)Cl_2$ as a solution so as to provide a vanadium concentration in the reactor of 1 mmole/liter (at this time, the concentration of vanadium fed was 2.86 times its concentration in the reactor), and a cyclohexane solution of ethyl aluminum sesquichloride as a catalyst to provide an aluminum concentration in the reactor of 4 mmoles/liter. In the meantime, the polymer solution was continuously withdrawn from the bottom of the reactor so that the amount of the polymer solution in the reactor was always maintained at 1 liter. Furthermore, from the top of the reactor, 40 liters/hr of ethylene and 80 liters/hr of nitrogen and 0.2 liter/hr of hydrogen were fed. The copolymerization was carried out at 10° C. by circulating a cooling medium through a jacket fitted to the outside of the reactor. As a result of performing the copolymerization reaction under the above conditions, a polymerization reaction mixture containing an ethylene/MBH random copolymer was obtained. A small amount of methanol was added to the polymer solution withdrawn from the bottom of the reactor to stop the polymerization. The polymer solution was put into a large amount of acetone/methanol to precipitate the resulting copolymer. The copolymer was fully washed with acetone, and dried under reduced pressure at 80° C. for one day. By the above operation, the ethylene/MBH random copolymer was obtained at a rate of 50 g/hr.

The copolymer had an ethylene content of 62 mole %, an intrinsic viscosity, measured in decalin at 135° C., of 1.79, an iodine number of 0.9, a crystallinity, determined by X-ray diffractometry, of 0%, a transparency, measured as in Example 15, of 3.4%, and a glass transition temperature (Tg) of 100° C. The melting point Tm of the copolymer was measured as in Example 15, but no melting curve (peak) was observed.

EXAMPLES 26–32 AND COMPARATIVE EXAMPLE 2

Example 25 was repeated except that the copolymerization conditions shown in Table 7 were used. The properties of the resulting copolymers are shown in Table 8.

COMPARATIVE EXAMPLE 4

A fully agitated 500 ml separable flask was fitted with agitating vanes, a gas blowing tube, a thermometer and a dropping funnel, and fully purged with nitrogen. Toluene (250 ml) dehydrated and dried by molecular sieves was put into the flask. Under a nitrogen stream, the flask was charged with 7.5 g of a cycloolefin (f) in Table 6 and 1 mmole of ethyl aluminum sesquichloride, and 0.25 millimole of $VO(OC_2H_5)Cl_2$ was added to the dropping funnel.

A gaseous mixture composed of 10 liters/hr of ethylene and 40 liters/hr of nitrogen was passed via the gas blowing tube through the flask kept at 10° C. for 10 minutes. $VO(OC_2H_5)Cl_2$ was added dropwise from the dropping funnel, and the copolymerization was started. While the gaseous mixture was passed, the copolymerization reaction was carried out batchwise at 10° C. for 30 minutes. Methanol (5 ml) was then added to the polymer solution to stop the copolymerization reaction. The polymer solution was then put into a large amount of methanol/acetone to precipitate the copolymer. The copolymer was washed with acetone, and dried under reduced pressure at 80° C. for one day. By the above operation, 5.4 g of copolymer was obtained. The properties of the copolymers were measured as in Example 25, and the results are shown in Table 9.

COMPARATIVE EXAMPLES 5–9

Comparative Example 4 was repeated except that the copolymerization conditions shown in Table 9 were used. The properties of the resulting copolymers are shown in Table 9.

TABLE 6

| | Cycloolefin | |
|---|---|---|
| (f) | [structure with C₂H₅] | 6-ethylbicyclo[2,2,1]hept-2-ene |
| (g) | [structure with CH₃] | 6-methylbicyclo[2,2,1]hept-2-ene |
| (h) | [structure] | tricyclo[4,3,0,1$^{2,5}$]-3-decene |
| (i) | [structure] | bicyclo[2,2,1]hept-3-ene |

TABLE 7

| Example | Cycloolefin[1] Name | Concentration in the reactor (g/l) | Catalyst Vanadium compound Name | Concentration in the reactor (mmol/l) | Ratio of the concentration of V fed to that of V in the reactor | Aluminum compound Name | Concentration in the reactor (mmol/l) |
|---|---|---|---|---|---|---|---|
| 25 | Table 6 (f) | 60 | VO(OC$_2$H$_5$)Cl$_2$ | 1 | 2.86 | Al(C$_2$H$_5$)$_{1.5}$Cl$_{1.5}$ | 4 |
| 26 | Table 6 (f) | " | " | " | " | " | " |
| 27 | Table 6 (f) | " | " | " | " | " | " |
| 28 | Table 6 (f) | " | VOCl$_3$ | " | " | " | 8 |
| 29 | Table 6 (g) | " | VO(OC$_2$H$_5$)Cl$_2$ | " | 4.5[2] | " | 4 |
| 30 | Table 6 (h) | 30 | " | " | 2.86 | " | " |
| 31 | Table 6 (i) | 60 | " | " | " | " | " |
| 32 | Table 6 (f) | " | " | " | 7[3] | " | 10 |
| Comp. Ex. 2 | Table 6 (f) | " | " | " | 13[4] | " | 8 |

| Example | Amount of ethylene fed (l/hr) | Amount of hydrogen fed (l/hr) | Polymerization temperature (°C.) | Amount of the copolymer yielded (g/hr) |
|---|---|---|---|---|
| 25 | 40 | 0.2 | 10 | 50 |
| 26 | 80 | 0.2 | * | 80 |
| 27 | 50 | 0.2 | 30 | 64 |
| 28 | 80 | 0.2 | 10 | 84 |
| 29 | 40 | 0.2 | * | 48 |
| 30 | * | 0.2 | * | 50 |
| 31 | * | 0.2 | * | 52 |
| 32 | * | 0.2 | * | 48 |
| Comp. Ex. 2 | * | 0 | * | 58 |

[1] Cyclooelfins of Table 3.
[2] 0.44 l/hr of toluene solution of the vanadium compound and 1.16 l/hr of toluene solution of the cycloolefin.
[3] 0.29 l/hr of toluene solution of the vanadium compound and 1.31 l/hr of toluene solution of the cycloolefin.
[4] 0.15 l/hr of toluene solution of the vanadium compound and 1.45 l/hr of toluene solution of the cycloolefin.

TABLE 8

| Example | Properties of the copolymer Ethylene content (mole %) | [η] (dl/g) | Iodine value | Crystallinity (%) | Haze (%) | DMA-Tg (°C.) | DSC-Tm (°C.) | $\bar{M}w/\bar{M}n$ |
|---|---|---|---|---|---|---|---|---|
| 25 | 62 | 0.79 | 0.9 | 0 | 3.4 | 100 | — | 2.5 |
| 26 | 70 | 1.38 | 1.0 | 0 | 3.5 | 73 | — | 2.7 |
| 27 | 84 | 1.18 | 0.8 | 0 | 5.5 | 30 | — | 3.0 |
| 28 | 71 | 1.39 | 0.9 | 0 | 3.4 | 74 | — | 2.6 |
| 29 | 63 | 0.72 | 0.8 | 0 | 5.7 | 99 | — | 3.3 |
| 30 | 62 | 0.70 | 1.0 | 0 | 4.2 | 98 | — | 2.5 |
| 31 | 64 | 0.80 | 0.9 | 0 | 3.9 | 99 | — | 2.3 |
| 32 | 68 | 0.83 | 1.0 | 0 | 11.6 | 92 | — | 3.8 |
| Comp. Ex. 2 | 64 | 2.12 | 0.9 | 2 | 18.4 | 97 | 74 | 5.2 |

TABLE 9

| Comparative Example | Cycloolefin[1] Name | Amount (g) | Catalyst Vanadium compound name | Amount (g) | Aluminum compound Name | Amount (g) |
|---|---|---|---|---|---|---|
| 4 | Table 6-b (f) | 7.5 | VO(OC$_2$H$_5$)Cl$_2$ | 0.25 | Al(C$_2$H$_5$)$_{1.5}$Cl$_{1.5}$ | 2.5 |
| 5 | Table 6-b (f) | " | " | " | " | " |
| 6 | Table 6-b (f) | 2.5 | " | " | " | " |
| 7 | Table 6-b (g) | 7.5 | " | " | " | " |
| 8 | Table 6-b (h) | " | " | " | " | " |
| 9 | Table 6-b (i) | " | " | 0.125 | " | 1.25 |

[1] Cycloolefin of Table 3

TABLE 9-b

| Comparative Example | Ethylene content (l/hr) | Polymerization temperature (°C.) | Amount of the copolymer yielded (g) | Ethylene content (mole %) | [η] | Iodine value | Crystallinity (%) | Haze (%) | DMA-Tg (°C.) | DSC-Tm (°C.) | M̄w/M̄n |
|---|---|---|---|---|---|---|---|---|---|---|---|
| 4 | 10 | 10 | 5.4 | 64.1 | 4.98 | 0.9 | 0 | 10.2 | 88 | — | 9.4 |
| 5 | 30 | " | 9.3 | 73.2 | 5.08 | 0.8 | 0 | 18.2 | 68 | — | 8.3 |
| 6 | 50 | 30 | 9.4 | 93.6 | 4.32 | 1.0 | 17 | 58.7 | −10 | 121 | 11.2 |
| 7 | 10 | 10 | 4.9 | 56.0 | 5.12 | 0.9 | 0 | 9.4 | 111 | — | 7.6 |
| 8 | " | " | 6.8 | 54.3 | 4.02 | 0.8 | 0 | 14.3 | 116 | — | 8.2 |
| 9 | " | " | 4.5 | 64.3 | 2.78 | 1.0 | 3 | 11.5 | 92 | 75 | 5.7 |

EXAMPLE 33

Fifty grams of the ethylene/DMON random copolymer (A) obtained in Example 1 was dissolved in 500 ml of xylene at 125° C. in a nitrogen atmosphere in a glass reactor. Then, a xylene solution of maleic anhydride (abbreviated as MAH) (12 g/30 ml) and a xylene solution of dicumyl peroxide (abbreviated as DCP) (0.27 g/30 ml) were fed gradually over a period of 4 hours from separate lines into the reactor.

Since MAN had low solubility in xylene, it was dissolved by heating with an infrared lamp, and the heating was continued until its feeding was terminated.

After the feeding, the reaction was continued for 2 hours, and after the reaction, the reaction solution was cooled to room temperature. The reaction solution was put into a large amount of acetone to precipitate the polymer. The resulting grafted ethylene/DMON copolymer was filtered, repeatedly washed with acetone, and dried under reduced pressure at 80° C. for 1 day to give the desired MAN-grafted ethylene/DMON copolymer. The amount of MAH grafted, measured by oxygen analysis of the modified copolymer was 1.13 by weight. The modified copolymer had an intrinsic viscosity, measured in decalin at 135° C., of 0.86 dl/g, a density, determined in accordance with ASTM D 1505, of 1.025 g/cm$^3$, a glass transition temperature. (Tg) of 145° C.

EXAMPLES 34–36

Example 33 was repeated except that 50 g of each of the cycloolefin random copolymers indicated in Table 10 was used instead of the ethylene/DMON random copolymer, and the grafting conditions were changed as in Table 10. The results are shown in Table 11.

TABLE 10

| | | Grafting conditions | |
|---|---|---|---|
| Example | Random copolymer | MAH (g/30 ml) | DCP (g/30 ml) |
| 34 | A | 12 | 0.27 |
| 35 | B | " | " |
| 36 | C | " | " |

A: Obtained in Example 1,
B: obtained in Example 4, and
C: obtained in Example 25.

TABLE 11

| | Properties of the modified copolymer | | | |
|---|---|---|---|---|
| Example | Amount of MAH grafted (wt. %) | [η] | Tg (by DMA method) | Density (g/cm$^3$) |
| 34 | 1.13 | 0.86 | 145 | 1.025 |
| 35 | 1.23 | 0.86 | 149 | 1.023 |
| 36 | 1.27 | 1.83 | 102 | 0.978 |

EXAMPLES 37–39

Example 33 was repeated except that the random copolymer, grafting monomer and the radical initiator were changed as shown in Table 12. The results are shown in Table 13.

TABLE 12

| Example | Random copolymer | Amount (g) | Grafting monomer | Amount (g) | DCP (g) |
|---|---|---|---|---|---|
| 37 | A | 50 | a | 20 | 0.33 |
| 38 | D | " | b | 16 | 0.34 |
| 39 | E | " | c | 10 | 0.27 |

A: Obtained in Example 1,
D: obtained in Example 2, and
E: obtained in Example 3
a: vinyl-tri-ethoxy silane
b: styrene
C: glycidyl methacrylate

TABLE 13

| | Properties of the modified copolymer | | | |
|---|---|---|---|---|
| Example | Amount of grafted monomer (wt. %) | $[\eta]$ | Tg (by DMA method) | Density (g/cm$^3$) |
| 37 | 0.25 | 0.87 | 144 | 1.026 |
| 38 | 1.34 | 0.86 | 138 | 1.021 |
| 39 | 1.13 | 0.85 | 142 | 1.023 |

What is claimed is:

1. A random copolymer characterized in that (A) the copolymer comprises polymerized units from ethylene and polymerized units from at least one cycloolefin selected from the group consisting of compounds represented by the following formula (I)

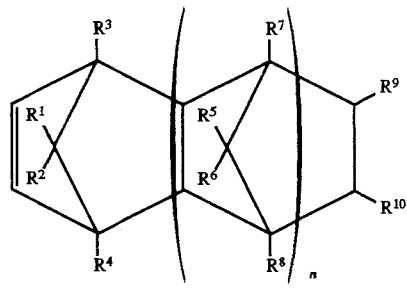

wherein $R^1$, $R^2$, $R^3$, $R^4$, $R^5$, $R^6$, $R^7$ and $R^8$ are identical or different and each represents a hydrogen atom, a halogen atom or an alkyl group having 1 to 10 carbon atoms, and $R^9$ and $R^{10}$ are identical or different and each represents hydrogen atom, a halogen atom or an alkyl group having 1 to 10 carbon atoms, or $R^9$ and $R^{10}$ are bonded to each other to form a group of the following formula

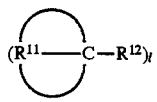

in which $R^{11}$ and $R^{12}$ are identical or different and each represents a hydrogen atom, a halogen atom or an alkyl group having 1 to 10 carbon atoms and l is an integer of 3 or 4, and n is 0 or a positive integer of 1 to 3, (B) the mole ratio of the polymerized units from the cycloolefin to the polymerized units from ethylene is from 5:95 to 60:40, (C) the cycloolefin of formula (I) is incorporated in the polymer chain as polymerized units represented by the following formula (II)

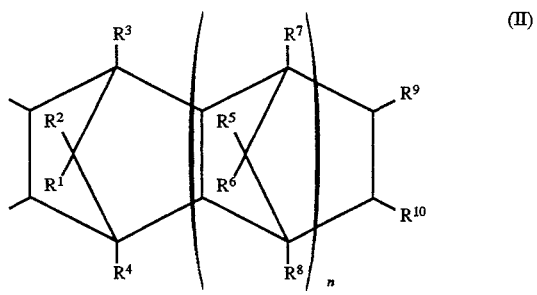

wherein all symbols are as defined above.

(D) the copolymer has an intrinsic viscosity ($\eta$) measured in decalin at 135° C., of 0.01 to 20 dl/g, (E) the copolymer has a molecular weight distribution ($\overline{M}w/\overline{M}n$), measured by gel permeation chromatography of not more than 4, (F) the copolymer has a crystallinity, measured by x-ray diffractometry, of 0 to 10%, and (G) the copolymer has a glass transition temperature (Tg) measured by dynamic mechanical analyzer of at least 10° C.

2. The random copolymer of claim 1 wherein the cycloolefin is a compound of formula (I) in which n is 0.

3. The random copolymer of claim 2 which has a glass transition temperature Tg of 10° to 130° C. as measured by dynamic mechanical analyzer (DMA).

4. A random copolymer characterized in that (A) the copolymer comprises polymerized units from ethylene and polymerized units from at least one cycloolefin selected from the group consisting of compounds represented by the following formula (I)-2

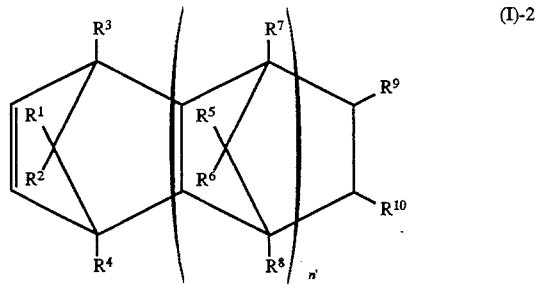

wherein $R^1$, $R^2$, $R^3$, $R^4$, $R^5$, $R^6$, $R^7$, $R^8$, $R^9$ and $R^{10}$ are the same or different, and each represents a hydrogen atom, a halogen atom or an alkyl group having 1 to 10 carbon atoms, or $R^9$ and $R^{10}$ are bonded to each other to form a group of the following formula

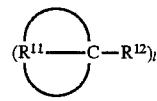

in which $R^{11}$ and $R^{12}$ are the same or different and each represents a hydrogen atom, a halogen atom or an alkyl group having 1 to 10 carbon atoms, and l is an integer of 3 or 4 and n is a positive integer of 1 to 3, (B) the mole ratio of the polymerized units from the cycloolefin to the polymerized units from ethylene is from 5:95 to 60:40, (C) the cycloolefin of formula (I)-2 is incorporated in the polymer chain as polymerized units represented by the following formula

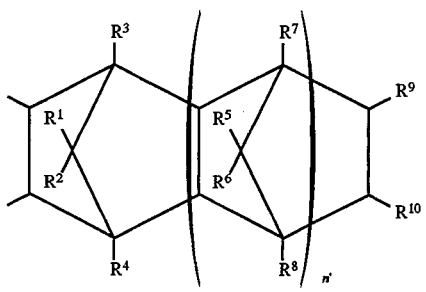

wherein all symbols are as defined above, (D) the copolymer has an intrinsic viscosity (η) measured in decalin at 135° C. of 0.01 to 20 dl/g, (E) the copolymer has a molecular weight distribution ($\overline{Mw}/\overline{Mn}$), measured by gel permeation chromatography, of not more than 4, (F) the copolymer has a crystallinity, measured by X-ray diffractometry, of 0 to 10%, and (G) the copolymer has a glass transition temperature (Tg) measured by dynamic mechanical analyzer of at least 10° C.

5. The random copolymer of claim 4 which has a glass transition temperature (Tg) of 10° to 240° C. as measured by dynamic mechanical analyzer (DMA).

6. The random copolymer of claim 4 wherein (B) the mole ratio of the polymerized units from the cycloolefin to the polymerized units from ethylene is from 5:95 to 50:50.

7. The random copolymer of claim 1 wherein (E) the copolymer has a molecular weight distribution (Mw/Mn), measured by gel permeation chromatography, of not more than 3.5.

8. The random copolymer of claim 1 wherein (E) the copolymer has a molecular weight distribution ($\overline{Mw}/\overline{Mn}$), measured by gel permeation chromatography, of not more than 3.

9. The random copolymer of claim 4 wherein (G) the copolymer has a glass transition temperature (Tg) of from 20° to 200° C. as measured by dynamic mechanical analyzer (DMA).

10. The random copolymer of claim 1 which has a bulk density of from 0.05 to 0.3.

11. The random copolymer of claim 1 which has a bulk density of from 0.1 to 0.25.

12. The random copolymer of claim 4 wherein n' is 1.

13. The random copolymer of claim 4 wherein n' is 2.

14. The random copolymer of claim 4 wherein n' is 3.

15. The random copolymer of claim 4 wherein $R^9$ and $R^{10}$ are bonded to each other and form the group of the formula

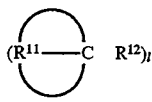

in which $R^{11}$, $R^{12}$ and l are as defined.

16. The random copolymer of claim 1, wherein (B) the mole ratio of the polymerized units from the cycloolefin to the polymerized units from ethylene is from 16.3:83.7 to 50:50.

17. The random copolymer of claim 4, wherein (B) the mole ratio of the polymerized units from the cycloolefin to the polymerized units from ethylene is from 16.3:83.7 to 50:50.

18. The random copolymer of claim 1 wherein in the definition of $R^1$ to $R^{12}$ the alkyl group is an alkyl group having 1 to 4 carbon atoms.

19. The random copolymer of claim 4 wherein in the definition of $R^1$, $R^2$, $R^3$, $R^4$, $R^5$, $R^6$, $R^7$, $R^8$, $R^9$, $R^{10}$, $R^{11}$ and $R^{12}$ the alkyl group is an alkyl group having 1 to 4 carbon atoms.

20. The random copolymer of claim 4 wherein the copolymer has a molecular weight distribution ($\overline{Mw}/\overline{Mn}$), measured by gel permeation chromatography, of not more than about 3.

21. The random copolymer of claim 4 wherein the copolymer further comprises polymerized units of a cycloolefin represented by formula (I)-1

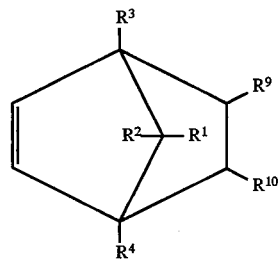

wherein $R^1$, $R^2$, $R^3$, $R^4$, $R^9$ and $R^{10}$ have the same definitions as in formula (I)-2, and wherein the cycloolefin of formula (I)-1 is incorporated in the polymer chain as polymerized units represented by the following formula (II)-1

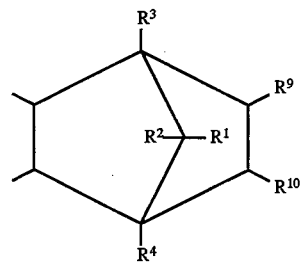

wherein $R^1$, $R^2$, $R^3$, $R^4$, $R^9$ and $R^{10}$ are as defined above.

* * * * *